US011828859B2

(12) United States Patent
Davidson et al.

(10) Patent No.: US 11,828,859 B2
(45) Date of Patent: Nov. 28, 2023

(54) NAVIGATION USING SELF-DESCRIBING FIDUCIALS

(71) Applicants: Morgan E. Davidson, River Heights, UT (US); Randall S. Christensen, North Logan, UT (US); Richard C. Robinson, Lindon, UT (US)

(72) Inventors: Morgan E. Davidson, River Heights, UT (US); Randall S. Christensen, North Logan, UT (US); Richard C. Robinson, Lindon, UT (US)

(73) Assignee: CANYON NAVIGATION, LLC, River Heights, UT (US)

( * ) Notice: Subject to any disclaimer, the term of this patent is extended or adjusted under 35 U.S.C. 154(b) by 212 days.

(21) Appl. No.: 17/347,149

(22) Filed: Jun. 14, 2021

(65) Prior Publication Data

US 2021/0311205 A1 Oct. 7, 2021

Related U.S. Application Data

(63) Continuation-in-part of application No. 16/572,591, filed on Sep. 16, 2019, now Pat. No. 11,036,946, (Continued)

(51) Int. Cl.
*G01S 19/39* (2010.01)
*G01S 19/43* (2010.01)
(Continued)

(52) U.S. Cl.
CPC .......... *G01S 19/393* (2019.08); *B64C 39/024* (2013.01); *G01S 19/40* (2013.01);
(Continued)

(58) Field of Classification Search
CPC ...... G01S 19/393; G01S 19/40; G01S 19/421; G01S 19/43; B64C 39/024; B64U 2101/20
(Continued)

(56) References Cited

U.S. PATENT DOCUMENTS 5,974,348 A 10/1999 Rocks
6,654,482 B1 11/2003 Parent et al.
(Continued)

FOREIGN PATENT DOCUMENTS

EP 1983398 12/2012

OTHER PUBLICATIONS

Mark Fiala, ARTag, a fiducial marker system using digital techniques, 2005.
(Continued)

*Primary Examiner* — Yazan A Soofi

(57) ABSTRACT

In one embodiment, a navigation system may include at least one self-describing fiducial with a communication element to communicate navigation state estimation aiding information comprising a geographic position of the self-describing fiducial with respect to one or more coordinate systems and a first navigating object to receive navigation information from an exterior system, receive navigation state estimation aiding information from the self-describing fiducial, and compare the navigation information received from the exterior system to the navigation state estimation aiding information to improve navigation parameters of the first navigating object.

20 Claims, 19 Drawing Sheets

Related U.S. Application Data which is a continuation-in-part of application No. 15/588,661, filed on May 7, 2017, now Pat. No. 10,417,469.

(60) Provisional application No. 62/333,219, filed on May 7, 2016.

(51) Int. Cl.
| | |
|---|---|
| *G01S 19/40* | (2010.01) |
| *B64C 39/02* | (2023.01) |
| *G01S 19/42* | (2010.01) |
| *B64U 101/20* | (2023.01) |

(52) U.S. Cl.
CPC ............ *G01S 19/421* (2013.01); *G01S 19/43* (2013.01); *B64U 2101/20* (2023.01)

(58) Field of Classification Search
USPC .......................................................... 701/533
See application file for complete search history.

(56) References Cited

U.S. PATENT DOCUMENTS

| | | | |
|---|---|---|---|
| 7,231,063 | B2 | 6/2007 | Naimark et al. |
| 7,739,034 | B2 | 6/2010 | Farwell |
| 9,056,676 | B1* | 6/2015 | Wang ....................... B64F 1/222 |
| 9,217,643 | B1 | 12/2015 | Belenkii et al. |
| 9,359,074 | B2 | 6/2016 | Ganesh et al. |
| 9,696,159 | B2 | 7/2017 | Chen et al. |
| 9,904,283 | B2* | 2/2018 | Liu ....................... G05D 1/0225 |
| 9,964,951 | B1* | 5/2018 | Dunn ......................... G06T 7/70 |
| 10,032,384 | B1* | 7/2018 | Boyd .................... G08G 5/0069 |
| 10,958,666 | B1* | 3/2021 | Witten ................. H04L 41/0895 |
| 2009/0177398 | A1 | 7/2009 | Belenkii et al. |
| 2012/0188350 | A1 | 6/2012 | Hammond et al. |
| 2014/0146167 | A1* | 5/2014 | Friend ................... G05D 1/0225 348/118 |
| 2015/0066240 | A1 | 3/2015 | Das Adhikary |
| 2015/0127251 | A1 | 5/2015 | Chen et al. |
| 2016/0068264 | A1 | 3/2016 | Ganesh et al. |
| 2016/0122038 | A1* | 5/2016 | Fleischman ............ B64C 39/024 244/114 R |
| 2016/0124431 | A1* | 5/2016 | Kelso ............... G06K 19/06037 701/28 |
| 2016/0274586 | A1* | 9/2016 | Stubbs .................. G05D 1/0234 |
| 2016/0292865 | A1 | 10/2016 | Floor et al. |
| 2017/0011333 | A1* | 1/2017 | Greiner .................. B64D 47/08 |
| 2017/0138732 | A1* | 5/2017 | Pettersson ............... G01B 11/25 |
| 2017/0329335 | A1* | 11/2017 | DelMarco .................. G06T 7/70 |
| 2018/0039286 | A1* | 2/2018 | Tirpak .................. G05D 1/0676 |
| 2018/0089481 | A1 | 3/2018 | Gerst et al. |
| 2018/0107211 | A1* | 4/2018 | Schubert ............. G08G 5/0021 |
| 2018/0155011 | A1* | 6/2018 | Greiner ................... B64C 15/02 |
| 2018/0204331 | A1* | 7/2018 | Omari .................. H04N 23/695 |

OTHER PUBLICATIONS

Justin R. Rufa, Ella M. Atkins, "Observed Time Difference of Arrival/GPS Fusion for Urban UAS Navigation using Particle Filtering Techniques", AIAA Guidance, Navigation, and Control Conference, Aug. 2013.

Allen D. Wu et al., "Autonomous Flight in GPS-Denied Environments Using Monocular Vision and Inertial Sensors", Journal of Aerospace Information Systems, vol. 10, No. 4, Apr. 2013.

Kevin Ling, "Precision Landing of a Quadrotor UAV on a Moving Target Using Low-cost Sensors", Thesis, University of Waterloo, Waterloo, Ontario, Canada, 2014.

Stephen M. Chaves et al., "NEEC Research: Toward GPS-denied Landing of Unmanned Aerial Vehicles on Ships at Sea", 2015.

Jun-Tao Li et al. "Design Optimization of Amazon Robotics", Automation, Control and Intelligent Systems, vol. 4, No. e, 2016, pp. 48-52.

Ramesh Raskar et al. "RFIG Lamps: Interacting with a Self-Describing World via Photosensing Wireless Tags and Projectors", Siggraph, 2004.

Mncent Calmettes et al. "Vision Aided INS/GNSS Integration for Improving the Robustness of a Navigation System for Mini Unmanned Aerial Vehicles", Proceedings of the 2013 International Technical Meeting of the Institute of Navigation, pp. 780-791, Jan. 2013.

Stefan Hrabar et al. "Vision-Based Navigation through Urban Canyons", Abstract only, Journal of Field Robotics, ~6(5), pp. 431-452, May 2009.

Chris Smith "Life Hack: Hidden trick helps you navigate New York's Central Park without Google Maps", http://BGR.com/Category/Lifestyle, Jul. 2015.

Young Ahn et al. "Autonomous Navigation and Localization of a Quad-Rotor in an Indoor Environment", AIAA Journal of Aerospace Information Systems, Mar. 2015.

Bhise, Tanmay "How does a windsock work." Aircraft Nerds, 2018, www.aircraftnerds.com/2018/08/how-does-windsock-work.html.

Thyagaraj, T et al. "Cooperative Navigation in Sparsely Populated Swarms" IOSR Journal of Computing Engineering, vol. 17, Issue 4, Ver. 1, pp. 82-87, Jul.-Aug. 2015, www.iosrjournals.org.

Ducatelle, Frederick, et al. "Cooperative navigation in robotic swarms", Swarm Intell (2014) 8:1-33, published Nov. 23, 2013.

Stirling, Timothy, et al., "Indoor Navigation with a Swarm of Flying Robots" 2012 IEEE International Conference on Robotics and Automation, St.. Paul Minnesota, USA, May 14-18, 2012.

Valasek et al., "Vision-Based Sensor and Navigation System for Autonomous Air Refueling", Journal of Guidance, Control and Dynamics, vol. 28, No. 5, Sep.-Oct. 2005.

Fosbury and Crassidis, "Relative Navigation of Air Vehicles," Air Force Research Laboratory, Space Vehicles Directorate, Kirtland Air Force Base, NM 87117, 2008.

Monda and Schaub, "Hardware Simulation of Relative Navigation Using Visual Sensor Information", AIAA 2005-5999, AIAA Guidance, Navigation and Control Conference, Aug. 15-18, 2005, San Francisco, CA.

Mokuno et al., "In-orbit demonstration of rendezvous laser radar or Unmanned Autonomous Rendezvous Docking", IEEE Transactions on Aerospace Electronic Systems, vol. 40, No. 2, Apr. 2004.

Wang et al., "INS/Vi/sNav/GPS relative navigation system for UAV", Aerospace Science and Technology 28, 2013, pp. 242-248.

Wilson et al., "A vision based relative navigation framework for Formation Flight", 2014 IEEE International Conference on Robotics and Automation (ICRA), May 31-Jun. 7, 2014, Hong Kong, China, pp. 4988-4995.

Wilson et al., "Guidance and Navigation for UAV Airborne Docking", Conference Paper, Jul. 2015, DOI 10.15607/RSS.2015.XI.017.

Sansone et al., "Low-cost relative navigation sensors for miniature spacecraft and drones",978-1-4799-7569-3/15, IEEE Xplore, pp. 389-394.

Wilson et al., "Vision-aided Guidance and Navigation for Close For Formation Flight", Journal of Field Robotics 33(5), 661-686 (2016).

Yunfeng et al., "Research on relative navigation algorithm for UAV Autonomous Aerial Refueling Rendezvous Phase", Proceedings of 2016 IEEE Chinese Guidance, Navigation and Control Conference, pp. 2076-2081, Aug. 12-14, 2016, Nanjing, China.

Marais et al., "Land mobile GNSS availability and multipath evaluation tool" EEE Transactions on Vehicular Technology, vol. 54, No. 5, pp. 1697-1704, Sep. 2005.

Soloviev et al., "Assessment of GPS Signal Quality in Urban Environments Using Deeply Integrated GPS/IMU", ION NTM 2007, pp. 815-828, Jan. 22-24, 2007, San Diego, CA.

Ray and Cannon, "Characterization of GPS Carrier Phase Multipath" ION 1999, pp. 343-352, 1999.

Xie et al., "Multipath Signal Assessment in the High Sensitivity Receivers for Vehicular Applications", 24th International Technical Meeting of Satellite Division of the Institute of Navigation, pp. 1764-1776, Portland OR, Sep. 19-23, 2011.

(56) References Cited

OTHER PUBLICATIONS

Ragothaman et al., "Multipath-Optimal UAV Trajectory Planning for Urban UAV Navigation with Cellular Signals", 2019, 978-1-7281-1220-6/19, IEEE Xplore.
Marais et al., "Toward accurate localization in guided transport: combining GNSS data and imaging information" Nov. 6, 2013, Transportation research. Part C, Emerging technologies, Elsevier, 2013, 15p. HAL ID: hal-00879677.
Meguro et al., "GPS Multipath Mitigation for Urban Area Using Omnidirectional Infrared Camera", IEEE Transactions on Intelligent Transportation Systems, vol. 10, No. 1, pp. 22-30, Mar. 2009.
Betaille et al., "A New Modeling Based on Urban Trenches to Improve GNSS Positioning Quality of Service in Cities", IEEE Intelligent Transportation Systems Magazine, pp. 59-70, Fall 2013, DOI: 10.1109/MITS.2013.2263460, date of publication: Jul. 23, 2013.
Breßler et al., "GNSS positioning in non-line-of-sight context—A survey", 2016 IEEE 19th International Conference on Intelligent Transportation Systems (ITSC), pp. 1147-1154, Rio de Janeiro, Brazil, Nov. 1-4, 2016.
Shytermeja et al., "Proposed architecture for integrity monitoring of a GNSS-MEMS system with a Fisheye Camera in Urban Environment", 978-1-4799-5123-9/14, 2014, IEEE Xplore.
Sánchez et al., "Use of a FishEye Camera for GNSS NLOS Exclusion and Characterization in Urban Environments", HAL ID: hal-01271970, Submitted on Nov. 29, 2017.
Rabaoui et al., "Dirichlet Process Mixtures for Density Estimation in Dynamic Nonlinear Modeling: Application to GPS Positioning in Urban Canyons", IEEE Transactions on Signal Processing, vol. 60, No. 4, pp. 1638-1655, Apr. 2012.
Sahmoudi et al., "Deep fusion of vector tracking GNSS receivers and a 3D city model for robust positioning in Urban Canyons with NLOS Signals", 978-1-4799-6529-8/14, IEEE Xplore, 2014.
Larson et al. "Characterizing Multipath from Satellite Navigation Measurements in Urban Environments", 1-4244-1457-1/8, pp. 620-625, IEEE Xplore, 2008.
Ali et al. "GNSS signal multipath error characterization in urban environments using LiDAR", 978-1-4673-4688-7/12, EEE Xplore, 2012.
Gowdayyanadoddi et al., "A Ray-Tracing Technique to Characterize GPS Multipath in the Frequency Domain", International Journal of Navigation and Observation, vol. 2015, Article ID 983124, 16 pages, 2015.
Xie and Petovello, "Measuring GNSS Multipath Distributions in Urban Canyon Environments", IEEE Transactions on Instrumentation and Measurement, vol. 64, No. 2, pp. 366-377, Feb. 2015.
Rae and Basir, "Reducing multipath effects in vehicle localization by fusing GPS with machine vision", 12th International Conference on Information Fusion, Seattle, WA, Jul. 6-9, 2009, pp. 2099-2106.
Soheilian et al., "Generation of an integrated 3D city model with visual landmarks for autonomous naviation in dense urban areas", 2013 IEEE Intelligent Vehicles Symposium (IV), pp. 304-309, Jun. 23-26, 2013, Gold Coast, Australia.
Le Marchand et al., "Characterization of GPS multipath for passenger vehicles across urban environments", ATTI dell'Istituto Italiano di Navigazione, 2009, pp. 77-88. hal-00445114.
Schneckenburger et al., "Characterization and Mitigation of Multipath for Terrestrial based Aviation Radionavigation", Navigation, Summer 2018, pp. 143-156, Institute of Navigation.

\* cited by examiner

NAVIGATION USING SELF-DESCRIBING FIDUCIALS

RELATED APPLICATIONS

The present application is a continuation-in-part of and claims priority to U.S. application Ser. No. 16/572,591, filed Sep. 16, 2019, titled "Navigation Using Self-Describing Fiducials", now U.S. Pat. No. 11,036,946, which claims priority to U.S. application Ser. No. 15/588,661, filed May 7, 2017, titled "Navigation Using Self-Describing Fiducials," now U.S. Pat. No. 10,417,469 which claims priority under 35 U.S.C. § 119(e) to U.S. Provisional Application No. 62/333,219, filed May 7, 2016, titled "Navigation Using Self-Describing Fiducials." These applications are hereby incorporated by reference in their entirety.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DESCRIPTION OF THE INVENTION

Figure 1:
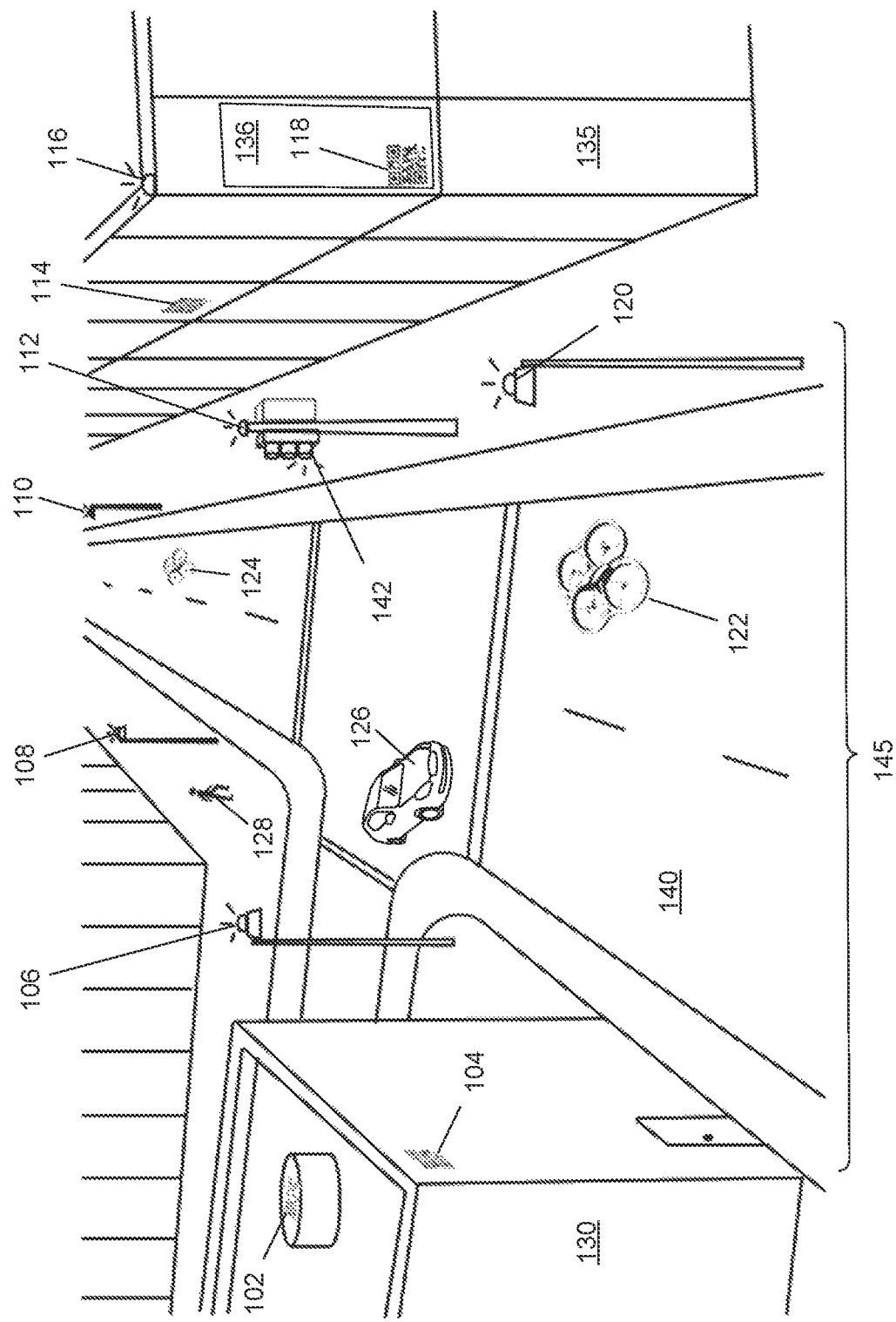
FIG. 1 is a diagram of an illustrative robust and secure autonomous navigation system utilizing self-describing fiducials, according to one embodiment of principles described herein.

Navigation can be understood as the process of estimating an object's position, velocity, and attitude (PVA), along with the associated uncertainty of the same quantities. The term "guidance" can be used to describe the control of the state (or path) of an object using the information obtained from the navigation process. One method for navigation is to blend measurements from two independent, but complementary sources by using mathematical algorithms, such as a Kalman filter.

An inertial measurement unit (IMU) can provide measurements of specific force (i.e. acceleration) and angular rate. Given an initial estimate, PVA can be propagated forward in time using measurements from an IMU. IMU measurements can be relatively accurate for the short term, but the PVA estimates can drift significantly over time due to inaccuracies in the several IMU sensors such as bias and noise.

In contrast, GPS-based position measurements can be relatively inaccurate over the short term, but are very stable in the long term, and can therefore be used to bound the long-term drift associated with the IMU measurements. Furthermore, through appropriate dynamics modeling inside a Kalman filter, several error sources in the IMU measurements can be estimated. These typically include bias, scale factor, and misalignment errors. Thus, by observing stable measurements over time, the IMU becomes calibrated and more capable of bridging periods with limited GPS availability. However, for prolonged GPS-denied or GPS-limited periods, the PVA drift can become problematic for successful guidance of the object.

Due to the relatively inaccurate clocks included in consumer-grade GPS receivers, four or more satellites can be required to determine three components of position and a receiver clock bias. The accuracy of GPS measurements is dependent on both the variance of the range measurement to the satellites in view and the geometric arrangement of the satellites. For example, several satellites clustered in the same portion of the sky all have the same range variance, but since the viewing geometry is poor, this will result in an inaccurate position measurement. This is termed geometric dilution of precision (GDOP). Conversely, several satellites that are more uniformly distributed across the sky results in low dilution of precision, and a more accurate position measurement.

There are numerous scenarios where access to GPS measurements is either limited or denied, or where the accuracy of the measurement is significantly degraded. One common scenario is natural or urban canyons, where the navigating object resides deep in the canyon and has a limited view of the sky. In this case, the GDOP is high, the number of visible satellites is low, and radio wave reflections cause errors in determining the range to the satellites. These error sources significantly degrade the accuracy of GPS measurements and can cause Kalman filter divergence and subsequent inability to estimate PVA resulting in inadequate guidance performance. Similar Kalman filter divergence and failure can also occur because of intentional degradation of GPS signals through the use of GPS jammers and spoofers.

Digital cameras can be a sensor for navigation in the presence of limited or denied GPS signals. A common approach for utilization of imagery data provided by these onboard cameras is referred to in the research as Simultaneous Localization and Mapping, or SLAM. In the SLAM approach, the state vector of the Kalman filter is augmented with the location of everyday features observed in the surrounding environment, and the filter attempts to compute the navigating object's PVA (localization) as well as the position of the observed features (mapping). While this approach has been demonstrated to be successful in some cases, the method suffers from significant map drift/error accumulation, is sensitive to incorrect correlation of features over time, and is computationally intensive due to growth of the Kalman filter state vector with each observed feature. This results in costly and power-hungry electronics and a probability of failure that is unacceptable for navigation and guidance of objects such as drones or driverless cars.

The challenge of correlating features over time can be partially overcome by distributing high-contrast artificial features, or fiducials, along the path of the navigating object. However, the problem of simultaneously mapping the fiducials and using them as navigation aids in a reliable fashion persists.

The elements, systems and principles described below describe guidance and navigation that is both low-cost and robust by developing self-describing fiducials which broadcast their position or identity, and a corresponding vision system on the navigating object that finds the fiducial in an image frame, extracts said information, and utilizes this information combined with the observed line-of-sight to the fiducial to perform navigation and guidance.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an embodiment", "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

Robust navigation can be understood as a process wherein unbiased PVA estimates are maintained throughout the trajectory of the navigating object, independent of the availability of GPS signals. A self-describing fiducial, as described herein, is any feature that communicates information to a navigating object that allows the navigating object to determine its position, velocity, or orientation with respect to the fiducial. For example, a self-describing fiducial may communicate its identity and/or location to the navigating object. In some embodiments, the self-describing fiducial may be a high-contrast feature that communicates information including fiducial identification, location (with associated covariance) with respect to a coordinate system as well as ancillary information such as traffic volume levels, flight corridor heights and lateral location, speed restrictions, weather information, no fly zones, traffic routing information, traffic patterns and pattern changes, an all-stop signal, etc.

Secure navigation systems can include the ability to encrypt the information transmitted by the self-describing fiducial, such that utilization of the system is limited to authorized objects only. In some embodiments, an autonomous navigation system can have the ability to acquire the fiducial, decrypt and decode the information being transmitted, and utilize the observed line-of-sight to the fiducial along with the decrypted information to autonomously estimate the PVA and the corresponding uncertainty.

FIG. 1 is a diagram of an illustrative example of several embodiments of navigating objects (122, 124, 126, 128) making use of a robust and secure autonomous navigation system utilizing self-describing fiducials (102, 104, 106, 108, 110, 112, 114, 116, 118, 120). In this diagram, several navigating objects are presented including drones (122, 124), a car (126), and a person (128). Several types of self-describing fiducials are also illustrated, including a beacon on top of a lamppost (106, 108, 110, 120), on top of a traffic light post (112), on a billboard, as part of the billboard display, and/or embedded in the traffic light (142) itself. Self-describing fiducials in the form of a barcode may also be used on the roadway (140), on the sides of buildings (130, 135) being used for navigation through the urban canyon, or on tops of buildings (102) to guide a drone to a landing location or drone service station. The drone service station may comprise a charging pad, maintenance/repair area, or a dedicated delivery drop-off location.

An illustrative embodiment of multiple drones navigating in an urban canyon is discussed, with descriptions of alternative embodiments where applicable. In FIG. 1, two drones (122, 124) are passing through an urban canyon (145) where reliable GPS signals are not available. Guidance algorithms control the trajectory of the drone (122) such that it follows a desired path through the urban canyon (145). Throughout the trajectory, the drone (122) should avoid collisions with surrounding structures (130, 135) and other drones (124), meanwhile contending with disturbances forces such as those from natural winds, turbulence from nearby drones and ground vehicle-traffic-induced winds. Unexpected obstacles can also exist such as new buildings, power lines, construction equipment, etc. To achieve robust, high drone traffic volume and at the same time avoid the many obstacles present, drones can be benefited by unbiased PVA estimates, with minimal associated uncertainty, and the ability to share their location.

The performance of the guidance algorithms, or the ability to control the path of the drone, is directly related to the accuracy of the PVA estimates resulting from the navigation process. If the PVA estimate is biased, this manifests itself as an offset from the desired path of the drone. A PVA estimate with high uncertainty manifests itself as random physical deviations from the desired path. Both of these characteristics require a larger flight volume around the desired path, and result in lower achievable drone density and less efficient use of public airspace. Highly accurate and precise line-of-sight measurements to fiducials with known locations can result in a PVA estimate that is unbiased and exhibits low uncertainty.

Minimizing the bias and uncertainty of the PVA estimates results in a drone that more accurately follows the desired path, enabling higher levels of drone traffic for a given corridor volume. As discussed herein, a robust and secure autonomous navigation system can be created using principles related to self-describing fiducials.

Figure 2A:
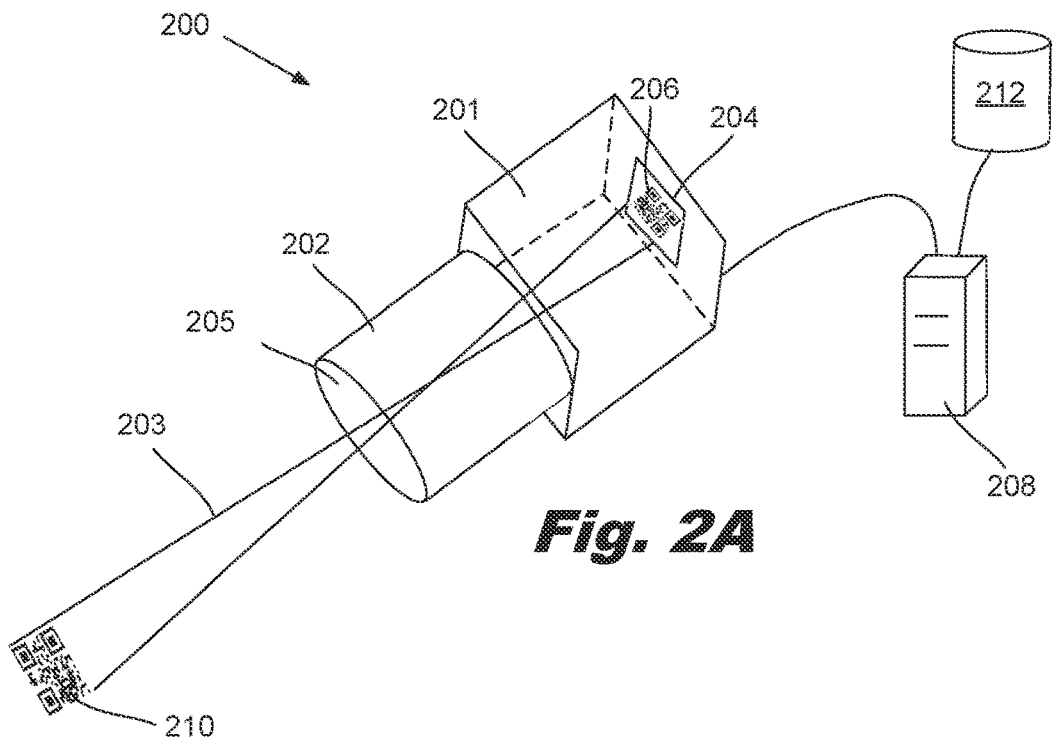
FIGS. 2A and 2B are perspective views illustrating elements within a robust and secure autonomous navigation system utilizing self-describing fiducials, according to embodiments of principles described herein.

FIG. 2A is a diagram of an illustrative imaging system (200) which resides on the drone or other navigating object and includes a camera body (201) which contains a focal plane (204). A lens (204) contains optics which focus light (203) from an exterior scene onto the focal plane (204). In this example, the lens (202) accepts light rays (203) through an aperture (205) and focuses the light rays onto the focal plane (204) to produce the image (206) of the passive, non-changing 2D barcode (210) embodiment of the self-describing fiducial. In this example, the self-identifying information is contained in the encoded pattern of the barcode (210). The image (206) of the barcode on the focal plane (204) is digitized and transmitted to a computing element (208) for further processing. The barcode information along with any corresponding or related data can be temporarily or permanently stored in data retrieval system (212).

There are a wide range of different self-describing fiducials that could be used. For example, the barcode could include a back light that shines visible wavelengths through the barcode mask, enabling autonomous acquisition of the fiducial in low-light scenarios. Another embodiment incorporates a dynamic or changing barcode wherein the barcode is modified as desired to transmit updated position or ancillary information. In another embodiment of an active barcode, to increase the magnitude of the emitted light relative to the surroundings, and maintain non-intrusiveness, the barcode emits light in non-visible wavelengths such as IR, NIR, or UV. Another embodiment of a barcode employs a static or changing 3D barcode such that that all information in the barcode is visible from any viewing angle. The 3D barcode could be an appropriately painted sphere or internally illuminated sphere with a barcode mask. In another embodiment, the self-describing fiducial is a bokeh code. In another embodiment, the self-describing fiducial consists of a series of symbols, whose information is decoded using character recognition. In another embodiment, the 2D barcode is stretched such that it appears uniform when viewed from a nominal viewpoint.

Figure 2B:
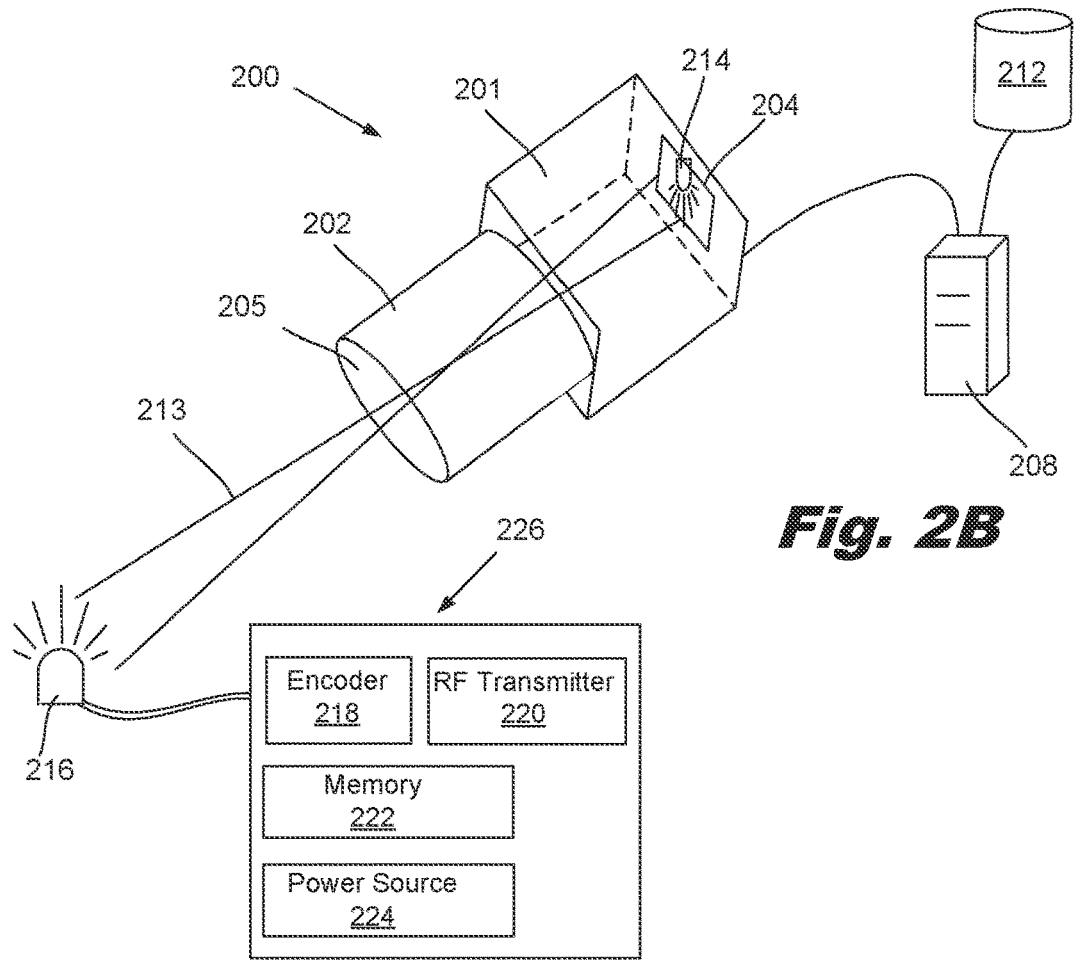

FIG. 2B illustrates an alternative embodiment wherein the self-identifying fiducial (216) includes an LED emitting light (213) in the visible wavelengths, driven by a power source, which emits light that is modulated to transmit the self-identifying information. The lens (202) accepts light rays (213) through an aperture (205) and focuses the light rays onto the focal plane (204) to produce the image (214) of the modulated light emitted by the LED fiducial. The intensity of the image (204) over time is digitized and transmitted to a computing element (208) for further processing. In this embodiment, the frame rate of the focal plane (204) can limit the amount of information that can be transmitted by the LED fiducial (216) per unit time. This is referred to as data throughput. The frame rate of the focal plane (204) can be increased by limiting the region of interest in the focal plane to the predicted pixel location of light emitted by the LED fiducial (216). The process of limiting the region of interest can be facilitated using current PVA estimates propagated using IMU measurements. This process also increases robustness by preventing multi-path (reflected) signals, spoofed observations, and minimizing false observations or false positives. Additionally, the gross motion of the image can be measured via optical flow, providing a prediction of where the light emitted by the LED fiducial (216) will be in the following image. In another embodiment, a quad-cell, or a four-pixel focal plane may record the time varying intensity of the observed LED fiducial at a very high rate, while a high resolution focal plane provides the observed line-of-sight. In another embodiment, to increase the magnitude of the emitted light relative to the surroundings, the LED may emit light in non-visible wavelengths such as IR, NIR, or UV. In another example, the wavelength of light of a light emitting self-describing fiducial (216) is selected to maximize observability and signal to noise ratio in expected environmental conditions, such as dust, fog, snow and rain. Alternatively, the self-describing information can be distributed over different wavelengths of light, thus multiplying the data throughput by the number of wavelengths utilized. In another embodiment, the fiducial may include more than one LED, both to increase the data throughput and to provide additional information. In another embodiment, polarization of the emitted light is used to preclude multi-path (reflected) observations. In another embodiment, the LED beacon broadcasts information at a very narrow wavelength, while the receiving camera has a band-pass filter which limits the incoming spectrum to the wavelength of interest, and rejects light from other wavelengths. The robustness of the LED-based fiducial system to incorrect or incomplete signals, may also be increased by using signal processing techniques such as checksums or similar algorithms.

The LED fiducial is only one example of a light emitting fiducial. A variety of other light emitters may be used, including lasers, laser diodes, broad band light emitters, or modulation of existing emitters such as street lights, billboards, projectors, outdoor electronic displays, lighted signs, etc. In one example, a laser system situated in a key location projects QR code self-describing fiducials onto facing buildings, using laser rangefinding information to estimate the position and position covariance of the fiducial, which information is embedded in the QR code for communication to navigating objects in the vicinity. In another example, large buildings form oversized fiducials by preferentially lighting or modulating light in rooms which are visible from the outside. In one embodiment, a triad of lasers at orthogonal angles to each other and of known different wavelengths, emanate from a single point and communicate self-describing fiducial information through modulation or similar means, from which fiducial the attitude of the navigating object can be directly measured in a single observation as well as the fiducial's position (the position of the origin, for use in a line-of-sight measurement). The frequency of the lasers may be selected so that the lasers are visible as they pass through the surrounding air. In another embodiment, an active, self-describing fiducial transmits additional information such as an indication that the navigating object is off a prescribed path, communicating motion correction commands much like a light bar on an aircraft carrier.

Figure 3A:
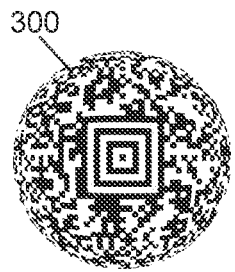
FIGS. 3A-3D show various self-describing fiducials and systems, according to one embodiment of principles described herein.

FIGS. 3A-3D shows a variety of different self-describing fiducials. FIG. 3A shows a globe (300) that has a barcode printed on it. In some examples, the globe fiducial may be internally illuminated for better contrast viewing of the bar code. In another example a glowing ball of known diameter with internal lighting or laser illumination forms a self-describing fiducial. In another embodiment, modulated sets of brake/tail/headlights on ground vehicles or navigation lights on air vehicles form self-describing fiducials which enable vehicles to distribute navigation information and calculations, with baseline light emitter separation distance included as part of the communication packet with which observers can extract additional range and attitude information from an observation. Further, the concepts and principles described above may be combined or used with additional elements to achieve the desired navigation outcomes.

Figure 3B:
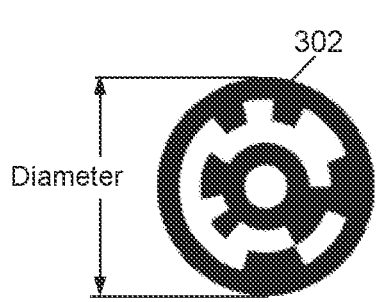

In some examples, the navigating drones may be able to make range observations based on the apparent size of the fiducial or the feature separation of elements of the fiducial. For example, the fiducial may have a known shape and/or size. As shown in FIG. 3B, a circular fiducial (302) may have a known diameter and when placed on a flat surface and when observed from a wide range of angles it appears as an oval with a major axis that corresponds to the diameter of the circle. Thus, the apparent size of the major axis of the oval allows for an estimate of the range from the fiducial to the drone to be made. The ratio of the major axis of the oval to the minor axis of the oval can provide an estimate of the angle of observation to be made.

Figure 3C:
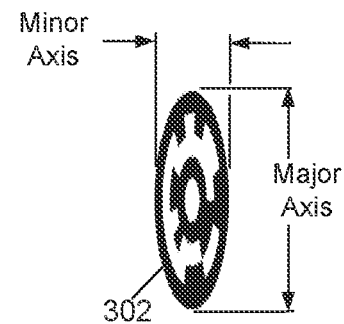
Figure 3C:
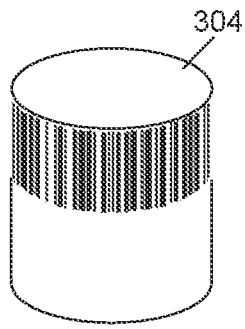

FIG. 3C shows a barcode (304) that is wrapped around a cylinder so that it can be observed from 360 degree angles. The data on the barcode (304) may be repeated so that the information can be retrieved from the barcode at any angle.

Other examples of fiducials that can allow for range or angle estimation may include QR codes with discernible features that have a predetermined size or spacing. In one embodiment, there may be multiple fiducials that have a known or estimated relationship to each other (a fiducial constellation or compound fiducial). A simple example of a constellation may be three points in a plane and one point out of the plane. This will create a coordinate system that provides at least a local location reference, and in many cases an attitude reference. For example, a first fiducial may be located on an upper corner of a rectangular building and an additional fiducials located on one of the edges that join to form the corner. This and other compound fiducial configurations may provide a number of benefits such as the ability of the drone, after locating one of the fiducials in the constellation to predict where other fiducials in the constellation will be located. This allows the drone to window down its camera and/or limit its analysis of the camera data to specific locations. This may save computational time, conserve processing power for other tasks, and may reduce the energy required by the processor.

Additionally, if the spatial relationship between the fiducials is known with a high degree of certainty, a location estimate of one of the fiducials can be translated to other fiducials in the constellation. It may also reduce the amount of data used to describe or communicate the fiducial information . . . the location of the origin and attitude can be transmitted as the complete description of the location of all of the fiducials in the constellation. Under ideal circumstances the location of each of the fiducials in the constellation would be known to a high level of accuracy and the relationship information between the fiducials in the constellation would be redundant. However, in real world conditions where the fiducials are placed in a GPS denied environment, the absolute location of the fiducials may be more difficult to obtain than the local relationships between the fiducials. Consequently, observation of the fiducial constellation can provide additional location information in some circumstances. For example, by knowing the relationship between the fiducials in the constellation, additional range and orientation information can be obtained from observations. In one example, the fiducials can be installed and then communicate between themselves, calculate a range between each other, and then initialize themselves into a local coordinate system. In some circumstances, this information may be sufficient for limited navigation of the drone or other navigating object because the drone may not need absolute positioning once it gets to a flight corridor. It can navigate along the flight corridor without absolute position if it knows its position and the position of the flight corridor relative to the local coordinate system created by the fiducial constellation.

Figure 3D:
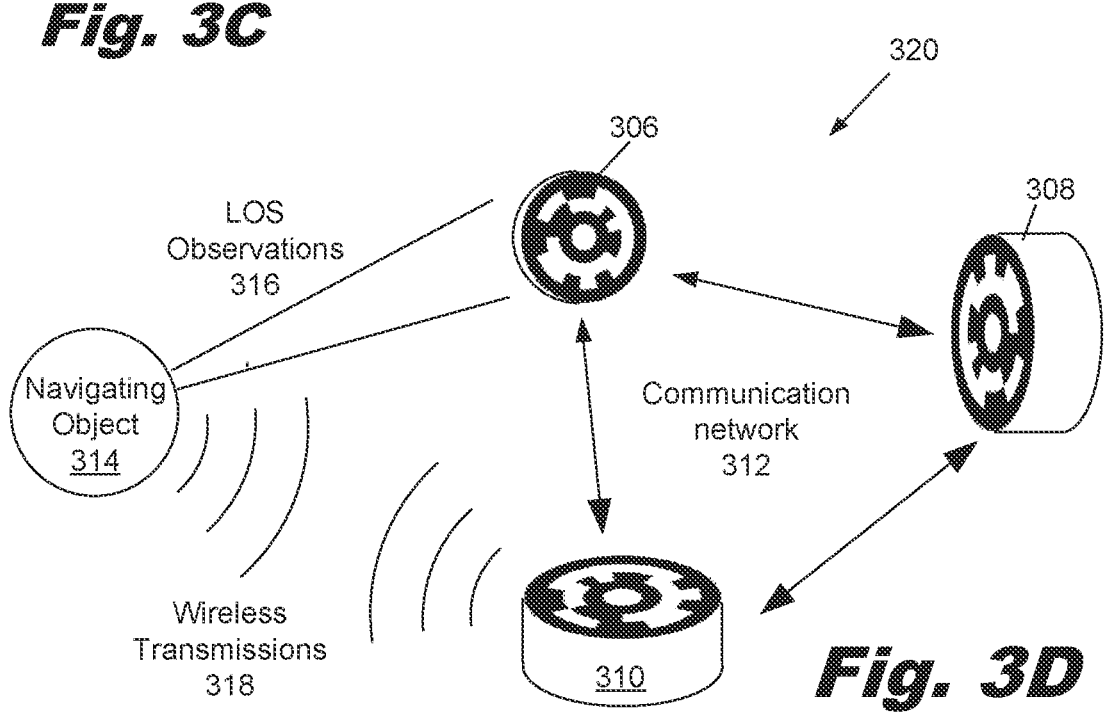

FIG. 3D shows a constellation of self-describing fiducials (306, 308, 310). These fiducials can communicate between each other using a communication network (312). The fiducials may communicate any relevant information, include their absolute or relative positions, information relating to drones or other navigating objects, transit coordinates, etc. These fiducials may include any of the features or elements described above, separately or in combination. For example, they may include circular QR codes with known sizes to allow for range and angle approximations to be made by observing objects (314). They may include encoded information in the QR code that communicates the location of the fiducial and/or an identity of the fiducial that allow for additional information to be accessed or retrieved. The fiducials may be back illuminated and/or may include modulating intensity or frequency of light to communicate information between other fiducials or to navigating objects. The fiducials may also include wireless communication capabilities that allow for one way or two way communication with other fiducials, navigating objects or other elements. For example, a navigating object (314) may be able to determine approximate distance from an active fiducial (310) using a number of techniques, including time of flight of an RF transmission, power of a transmitted signal, or other techniques. This information can be combined with line of sight observations to assist the navigating object.

Figure 4:
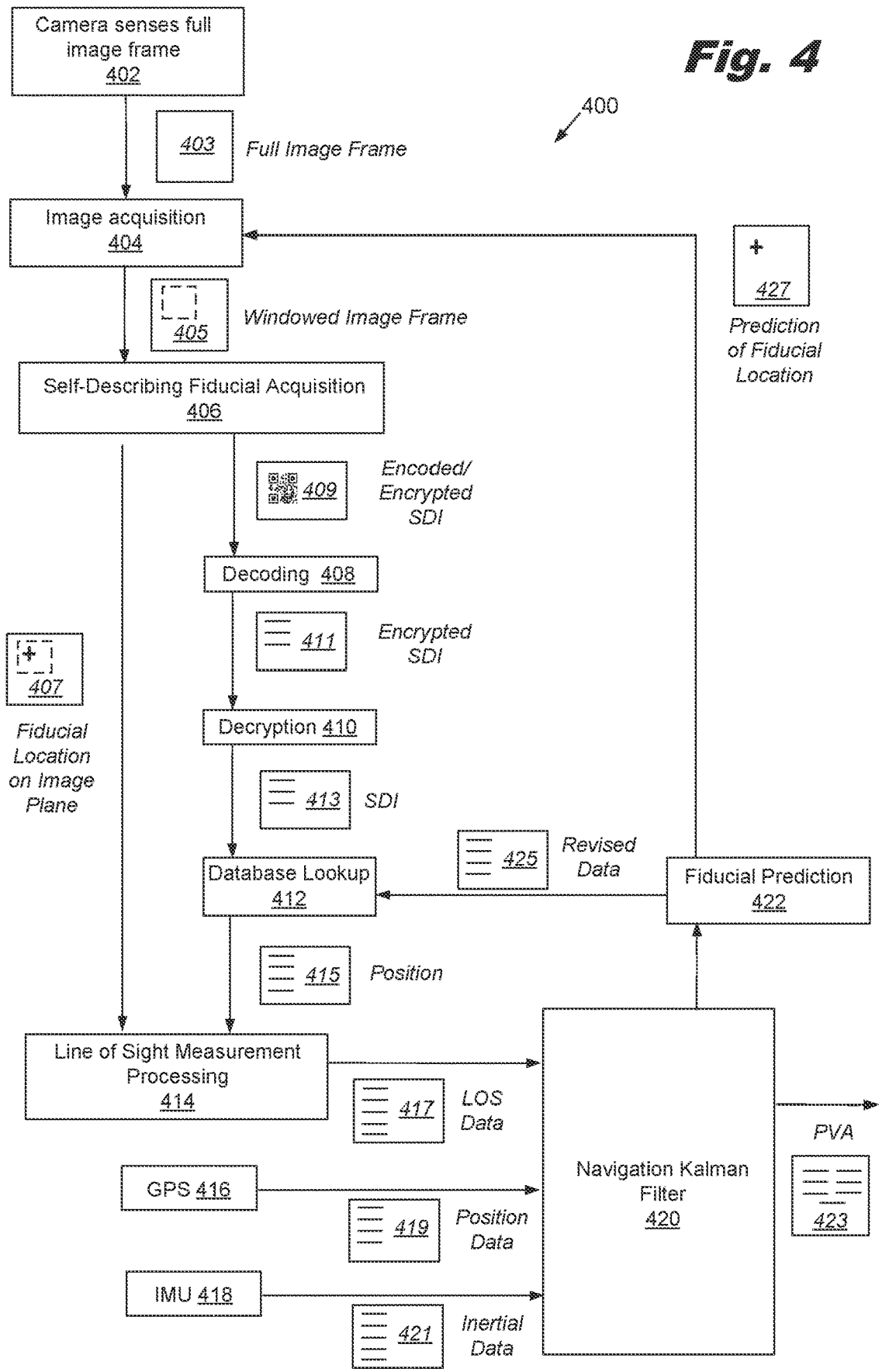
FIG. 4 is a flowchart of an illustrative method for robust and secure autonomous navigation utilizing self-describing fiducials, according to one embodiment of principles described herein.

FIG. 4 is a flowchart showing an illustrative example of a system and method (400) for robust, secure autonomous navigation system utilizing self-describing fiducials. According to one illustrative embodiment the navigation system is initialized using IMU measurements from zero velocity conditions and GPS position measurements. While available, GPS position measurements are processed, resulting in PVA estimates and associated covariance estimates.

Prior to entering a GPS-denied environment, the image (403) produced by the focal plane (step 402) is acquired (step 404) and scanned for a candidate barcode or other fiducials. This may include searching a windowed image frame (405). Once the barcode fiducial is acquired (step 406), the barcode pattern (409) is decoded to extract a dataset (step 408). The dataset may be an encrypted SDI (411) or may directly produce the desired information. The decryption (step 410) may be performed using an onboard key and to extract the self-describing information contained in the barcode fiducial. Additionally or alternatively the decryption or decoding process may access a database of information that is indexed according to the information communicated by the self-describing fiducials.

Once the self-describing information (413) is obtained, additional information can be obtained from a database lookup (step 412). The position and other information obtained (415) can then be used to predict the line-of-sight of the fiducial in the next image frame (step 422), given the current PVA estimates.

The position of the fiducial (415) and the fiducial location on the image plate (407) are used in a line of sight (LOS) processing module (414) to calculate LOS data (417) as an input into the navigation Kalmann filter (420). The LOS data (417), GPS data (419) from the GPS unit (416), if available; and inertial data (421) from the IMU (418) can be combined in the navigation Kalmann filter to produce a PVA estimate (423) that allows the drone or other navigating object to understand its current position, velocity and attitude, thereby providing the information to navigate. Additionally, the Kalmann Filter may output a fiducial prediction (422) that predicts where the current fiducial is expected to be and/or where the next fiducial(s) are expected to be. If the location of the fiducial is uncertain or has an estimated error beyond a limit, revised data (425) produced from the fiducial prediction may be incorporated into the database (412). This will improve the database information/lookup progressively as more observations of the fiducials are made. The fiducial prediction module (422) may also produce a prediction of the fiducial location (427) that can be used to acquire the self-describing fiducial by predicting a window within the image frame that the fiducial is expected to be in. Ideally this allows for faster processing of the image because only a portion of the image needs to be searched to locate the fiducial.

Additionally or alternatively, a grid system is utilized to minimize data throughput requirements, and to gradually transmit higher precision position information of the fiducial. In the grid system, a limited number of bytes are transmitted which specify the grid square that the vehicle is currently located in. Subsequent bytes specify the location of the vehicle inside the grid, with adjustable precision. Alternatively, data could be transmitted from most significant bit to least significant bit, such that the precision of the fiducial increases with the duration of lock-time on the fiducial.

In some examples, the measured line-of-sight of the barcode fiducial can be obtained directly from the digitized image. The difference between the predicted line-of-sight and the measured line-of-sight forms the residual. A nonzero residual is indicative of PVA estimation errors and is used inside the Kalman filter to provide first-order corrections to the PVA estimates. The current and possibly past PVA estimates provide a prediction of where in the current image the previously-acquired fiducial is likely to appear, which enables a search window of limited size and higher frame rate.

In addition to the embodiments described above, the principles described above may be implemented in a variety of ways. For example, the self-describing fiducials may serve as a complementary navigation system, in combination with available GPS signals, and/or serve as a standalone navigation aiding system which could replace the information gained from GPS, or serve as an independent terrestrial alternative, providing increased robustness and an independent indication of GPS signal failure.

Additionally, the self-describing information may be decoded and decrypted to obtain ancillary information such as traffic volume levels, flight corridor heights and lateral location, speed restrictions, weather information, no fly zones, traffic patterns and pattern changes, an all-stop signal, etc. In another embodiment, the corrections produced by the Kalman filter provide corrections to the PVA estimates that are accurate to second-order, accounting for the nonlinearities present in line-of-sight observations. In another embodiment, alternative filtering techniques such as a least-squares filter, an unscented Kalman filter, an information Kalman filter, or particle filter are employed to provide corrections to the PVA estimates. In another embodiment, navigating objects maneuver such that PVA are optimally estimated given the spatial distribution of the self-describing fiducials in the vicinity. In another embodiment, a wearable self-describing fiducial is used for relative navigation of a drone which serves as a personal fan, light or observation post. In another embodiment, a wearable self-describing fiducial is used to enable people routing at large events, with overhead drone ushers shining color coded lights, forming person or group-specific paths on the ground which direct people to their entry points, exit points, restrooms or parking spots.

Figure 5:
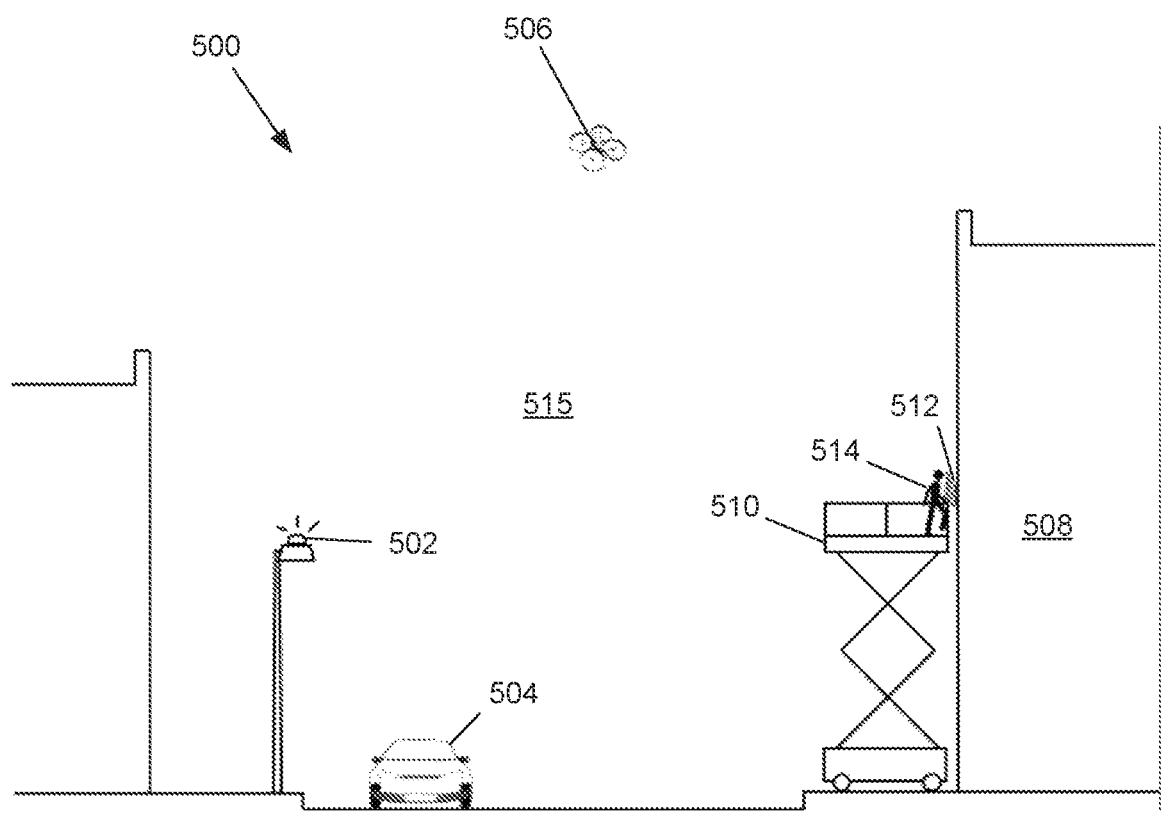
FIG. 5 is a diagram of an illustrative method for installing a self-describing fiducial for a robust and secure autonomous navigation system, according to embodiments of principles described herein.

FIG. 5 illustrates one illustrative installation process of self-describing fiducials. In a representative embodiment (500), the fiducials (502, 512) can be installed in a variety of ways, including by a manned crew (514) on elevated structures (510) inside the urban canyon (515) where GPS signals are typically unreliable. Localization of the fiducials (502, 512) can be performed by long-term GPS observations, long enough to remove the effects of limited GPS satellite visibility, as well as ionospheric and tropospheric noise terms. In another embodiment, localization of the installed fiducials is performed by an observer drone above the urban canyon with stable GPS signals. By observing the line-of-sight to the newly-installed fiducial (and previously-installed self-describing fiducials within the field of view) during translation of the observer drone(s) (504, 506), the location of the newly-installed fiducial (512) can be autonomously calculated using well-known methods such as bundle adjustment or the coplanarity constraint equations. In addition, observing previously-installed self-describing fiducials (502) during the localization process of new fiducials (512) further improves localization accuracy. Additionally the amount of translation performed by the observer drone can be more accurately measured using carrier phase GPS signal processing. In another embodiment, new self-describing fiducials can be installed by a drone that utilizes previously-installed and previously-localized self-describing fiducials for navigation and accurate guidance.

Additionally, the spatial distribution of the self-describing fiducials can be selected such that the navigating objects achieve a desired navigation accuracy with respect to one or more coordinate systems. Given a set of requirements for the navigation system (such as accuracy, navigating object velocity, number of beacons visible at all points along a predetermined path to be traveled, system installation and operational costs, etc.), optimization algorithms such as Monte Carlo, gradient descent, linear programming, or convex optimization can be used to determine an optimal physical distribution of beacons in the neighborhood of the path. If desired, the beacons can also be placed with sufficient physical distribution (both horizontal and vertical) such that the position and attitude of the navigating object can be uniquely calculated from a single observation.

Additionally or alternatively, given a set of beacons physically distributed in the neighborhood of a flight corridor, optimization algorithms such as Monte Carlo, gradient descent, linear programming, or convex optimization can be used to determine a flight path that optimizes a set of requirements such as state observability, number of beacons instantaneously within the FOV, covariance of PVT estimates or IMU calibrations. Further, a drone or other navigating object may translate along a nominal path while simultaneously perturbing its attitude independent of the path to optimize navigation aiding from observations of the self-describing fiducials.

In one example, drones that may need to re-calibrate sensor parameters in flight (including IMU scale factor, bias, misalignments, camera parameters such as distortion, focal length, magnetometer bias, etc.) can enter a navigation estimate maintenance corridor (either above, below or to the side of normal traffic corridors) where it has more freedom to perform optimal maneuvers for sensor parameter estimation, such as circles, figure eights, or Lissajou curves.

In one embodiment, the system of self-describing fiducials is made up of a fleet of drones or other mobile equipment. For example, along a specific route there may be 10 specialized drones that fly into strategic positions and broadcast their position using one or more self-describing fiducials. The specialized drones may initially fly at a relatively high altitude to fix their position using available GPS information and register the locations of visual landmarks below them. They can then descend into the urban canyon or GPS denied environment and supplement their IMU data with visual landmarks and any GPS information that may be available. In some embodiments, the drones that are descending into the GPS denied environment may use another portion of the drone fleet above them as fiducials to more accurately determine their position as they descend. Once the lower fiducial drones are in a desired location/distribution, they can secure themselves to surfaces and act as passive or active fiducials to the drone or other navigating object traffic in the GPS denied area.

Additionally or alternatively, drones may place separate fiducials on surfaces in the GPS denied environment. For example, a drone may gather information about its location and place a printed sticker containing a self-describing fiducial at that location and then move on a different location to place the next printed sticker. In other embodiments, the drone may apply a self-describing fiducial mark using other techniques such as inkjet printing, spray painting or laser etching. For example the drone may include a reservoir of visible or IR ink and a method of dispensing the ink onto a surface that will support the self-describing fiducial. Other techniques may include laser etching surfaces so that the etched and unetched surface reflect light differently at a desired wavelength or range of wavelengths. In one example, the drone may simply carry self-describing fiducial modules that are attached to structures or the ground and transmit their location or other information. For example, the drone may have a number of self-describing fiducial darts or rounds that can be shot at a building or structures. The darts/rounds may have an embedded LED that transmits information or communicates navigation information in some other way. The darts/rounds may partially penetrate or adhere to the structures.

In one embodiment, a drone may or may not have information that describes the location of a self-describing fiducial at the time the fiducial is placed or created. The fiducial may simply identify itself in a way that allows for the desired information to be referenced from a different source. For example, a relief operation may be undertaken in an urban environment where GPS signals are being disrupted by buildings and/or by active jamming equipment. A fleet of "marking" drones enters the area and makes self-describing fiducial markings on buildings without having precise information about the location of the fiducials. The information encoded/transmitted by the fiducials have generic labels that at least identify the fiducial. A "best guess" of the fiducial position and position covariance can be made by the "marking" drone and entered into a matrix/database. As "mule" drones enter the area carrying the desired payloads, they optically identify the fiducials and look up the approximate location of the fiducials from the matrix/database. They use this location information to navigate and supplement their IMU sensors/calculations and any other guidance information that can be derived from GPS or visual data. However, the collective location/navigation information from the set of navigating drones is also used to fine tune the matrix/database of fiducial information. Thus, the matrix/database of fiducial locations may initially be relatively coarse, but becomes more refined over time as more drones contribute navigation information or other sources of location information are obtained. In one example, drones that enter the GPS denied environment may navigate through the area as best they can using SLAM along with whatever fiducial information and sensor synthesis is available. They go into the area with a high accuracy/precision navigation information and can transfer this information to the matrix for the fiducials that they first encounter. They may lose accuracy as they progress into the GPS denied environment and then recover accuracy as they exit the area or cross an already refined set of fiducials. As they discover the errors in their navigation data upon exiting the GPS denied environment, their observations of fiducials before they exited the GPS denied environment can be improved and propagated into the fiducial matrix/database. Thus, the accuracy of the matrix/database improves over time because of the accumulated observations.

Figures 6A, 6B:
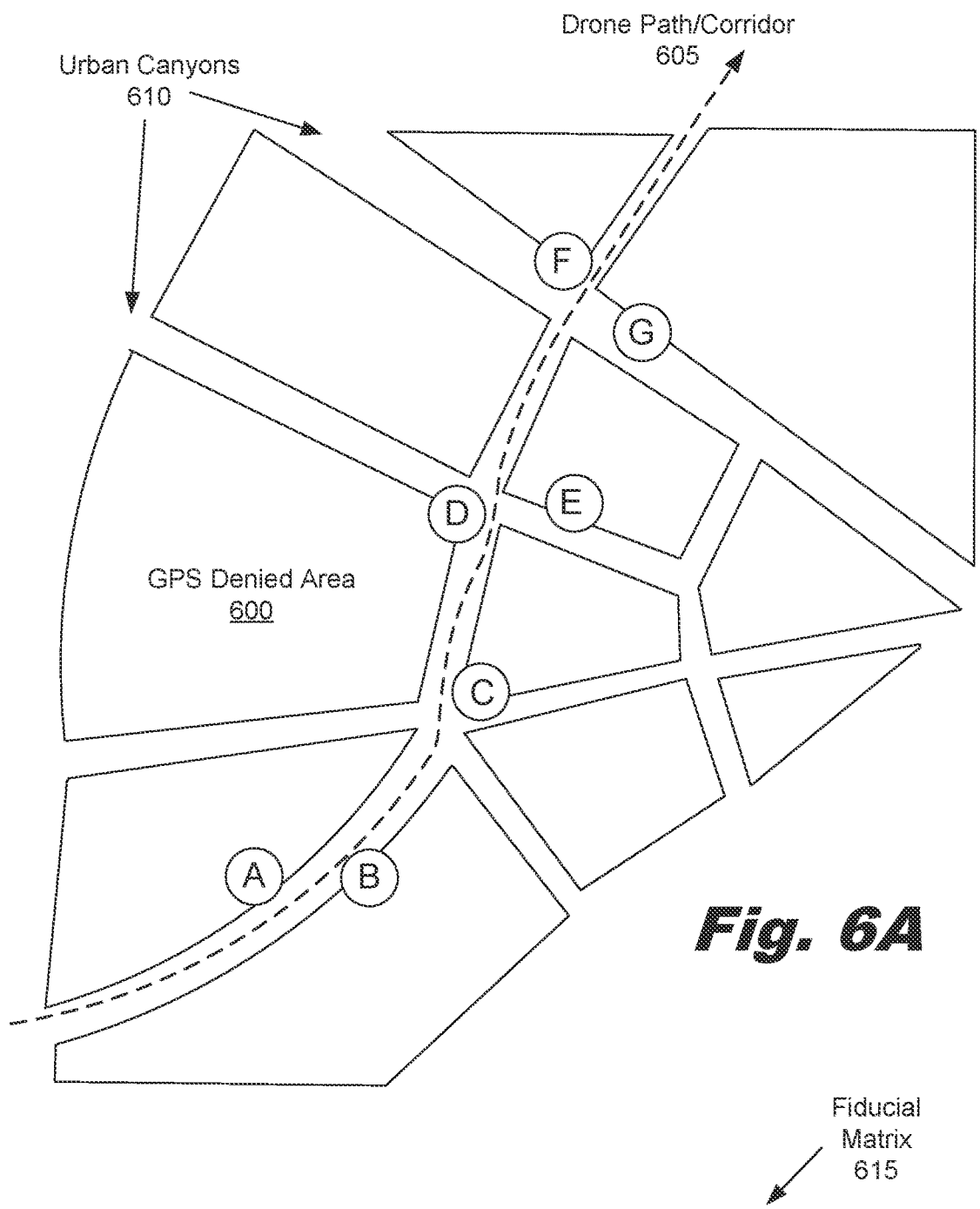
FIGS. 6A-6B describe illustrative systems and methods for deploying and using self-describing fiducials in a GPS denied area, according to one embodiment of principles described herein.

FIGS. 6A and 6B illustrate one example of the above principles. FIG. 6A shows a plan view of a GPS denied area (600). The GPS denied area (600) may be actively denied by jammers/spoofers and/or may include urban canyons (610). The "marking" drone may place/identify the first several fiducial marks (A, B, C) with an accuracy of centimeters but as it proceeds deeper into the GPS denied environment the covariance of the fiducial locations (D, E, F, G) may increase to meters or even tens of meters. The fiducials mark a drone path or corridor (605). The fiducials, once placed and associated with location information, may be used for ground based drones, air-based drones, missiles, ground troops, first responders or other navigating objects.

The first "mule" drone that is delivering humanitarian supplies can progress with confidence through the first fiducials (A, B, C) and then rely primarily on its IMU data as it continues deeper into the GPS denied area. Its observations of the next several fiducials (D, E) may be fairly accurate and are propagated to the matrix/database. However, the "mule" drone may make less accurate observations of fiducials F and G. But as it exits the GPS denied environment close to F and G, the accuracy with which it knows its position increases dramatically. This information is propagated backward in time to increase the accuracy of the last several fiducial observations (F, G). Consequently, as additional drones pass through the area, each can progress with more confidence in the area marked by fiducials (A, B, C, D, E, F, G) and contribute more accurate PNT information to the matrix/database from their own observations.

The example given above is only illustrative. A variety of variations, combinations, and extensions of the principles described could be used. For example, drones could be specialized to improve the distribution of fiducials and rapidly increase the location accuracy of the fiducial matrix. "Marker" drones may be adept at visually identifying desirable locations for fiducials and accurately placing the fiducials on the surfaces. self-describing fiducials may be placed near high contrast, pre-existing landmarks, creating an optimized coarse-fine fiducial matrix. A "surveyor" drone with superior navigation/communication equipment may follow the marker drone(s) and refine the location estimates of the fiducial matrix. The "mule" drones may simply use the fiducials or may contribute location observations to the matrix/database.

In other embodiments, a single drone may perform all tasks. For example, a drone may have a marker payload and enter the GPS denied environment, place its markers, transmit (if possible) or store the best known location of the self-describing fiducials and select an exit from the area that increases its chances of obtaining relevant navigation information to add to the fiducial matrix/database. It then obtains another marker load and reenters the area to improve the location information for the previously placed fiducials and to place/locate additional fiducials. It may take a different route within and enter/exit the area from different locations to optimize the navigation information. The drone may then have access to enough self-describing fiducials to navigate with a payload to a specified location with a required accuracy.

Additionally or alternatively, multiple "marker" drones may enter the GPS environment from different directions/routes and place self-describing fiducials as they go, then cross paths or exit along entry paths of other marker drones. This will allow the exiting drones to make observation of fiducials placed by other drones and allow for more precise navigation during the exit. The observations of all the drones are combined (in some examples in real time) to create a more accurate self-describing fiducial matrix/database. FIG. 6B shows one example of a self-describing fiducial matrix (615). This matrix may include a variety of information, including a fiducial identifier (Fiducial ID), location information of the fiducial (X, Y, Z), an error estimate of the location (Error Est.), a relative location (Rel. Loc.) of other fiducials or landmarks, updated information (Update Data) that records data that was added/improved in the matrix, a waypoint log (Waypoint Log) that records which navigating objects have encountered the fiducial, and other data. This other data may be any data that has been described herein or other data that could be useful to the navigating objects or self-describing fiducial system.

As described above, a self-describing fiducial navigation system may be a low-cost, resilient backup navigation system for GPS denied situations such as tunnels, urban canyons, extreme weather events, GPS/GLONASS/GALILEO satellite dropouts or destruction during wartime. In one example, a drone could serve as a self-describing fiducial in an emergency (modulating one or more LEDs of its own). This capability is synergistic with a quick response, for example to an accident on a busy roadway, since the drone would get to the scene of the accident before a patrol car could, and would assess the situation, determine medical personnel needs, broadcast the precise location of accident, and re-route traffic around the accident site. In another embodiment, QR codes or other self-describing fiducials could be placed on mile markers and other plentiful signage "real estate" along roadways. In some instances, a pre-existing sign could be used as a self-describing fiducial. For example, mile markers are optically read by a navigating object and associated with their location in a database. Additionally, electronic signs that incorporate light banks or lighted TV boards could be used as updateable fiducials. In some examples, the electronic signs could be used as compound fiducials by illuminating only a portion of the sign. For example, corners of a large electronic sign could be modulated to form a large 2D self-describing fiducial. In some instances the 2D self-describing fiducial may broadcast its baseline distance to allow for range and attitude estimates to be made. As discussed above, the sign fiducials may broadcast other information such as weather and wind information or the location of a recharging station or drop-off point.

The modulation of light (i.e. changing the intensity of the light) has been discussed as one way for a self-describing fiducial to transmit information. However, there are a number of different parameters in addition to the intensity of the light that could be modulated. For example, the frequency or phase of light or other electromagnetic signal property could be modulated. One example may be a self-describing fiducial that broadcasts radio frequency signals that are monitored by a drone. The drone could use the doppler effect to obtain a range rate (RF) measurement, or time of flight from radar to obtain a range measurement. In another example, the navigating object emits a wavelength of electromagnetic radiation, such as light in a flash lidar system, and self-describing fiducials with phosphorescents respond with a known signature, much like echolocation for bats, but with purpose-built self-describing fiducials. In another embodiment, a holographic projector is used to project three dimensional self-describing fiducials. In this case, the viewing angle determines what is seen, providing additional navigation information. A related embodiment is self-describing fiducials formed from active or reflective bokodes, which can be less intrusive than QR codes.

Other sources of information can also be used to improve the accuracy of the fiducial matrix, including laser range finding to measure distances to/between fiducials, optical matching to photo reconnaissance images or data, manual observations by support personnel, sonar or radar observations, or other sources.

As described above, the self-describing fiducial enables accurate navigation and associated improved guidance GPS-degraded or denied environments. This enables higher traffic density at acceptable safety levels when GPS is not available. Supplemental information could further increase the overall efficiency and safety of an object performing navigation and guidance. This is accomplished by providing at least one of navigation-aiding information and guidance-aiding information, as described below.

As described herein, a self-describing fiducial communicates its own position with respect to one or more coordinate systems. A navigating object in the vicinity of the self-describing fiducial uses line of sight measurements to one or more of these now known positions to aid its navigating estimation system over time. In many cases this navigation estimation system includes a variant of a Kalman or similar estimation filter, and the addition of self-describing fiducial observations as an aiding source results in an improved estimate of navigation states such as position and attitude of the navigating object. Aiding sources that provide more accurate navigation aiding information will improve the quality of resulting navigation state estimates more than aiding sources that provide less accurate information. In a similar way, aiding sources with one or more additional dimensions of navigation aiding information will improve the quality of resulting navigation state estimates more than aiding sources with fewer dimensions.

In one example, the self-describing fiducial communicates not only its own position, but also at least one component of its own attitude with respect to one or more coordinate systems. This compromises at least one additional dimension of navigation aiding information. In this embodiment, the self-describing fiducial is also enhanced with at least one associated attitude-describing feature that is observable by navigating objects in the vicinity, indicating to the navigating object or objects at least one component of the self-describing fiducial's own attitude with respect to one or more coordinate systems.

Navigating objects in the vicinity can extract a more powerful navigation measurement from a single observation of this enhanced self-describing fiducial due to the additional dimensions of navigation-aiding information. Attitude-describing features that have observable directionality could include a row of light emitters, a visible arrow or arrows, lines, patterns of elements, motion or apparent motion of observable features such as running lights, orientation of a pattern such as a quick response (QR) code or projection of such features onto a surface like a roadway or the wall of a building. In some instantiations of this embodiment, the communicating element of the self-describing fiducial also comprises the attitude-describing feature or features. In other instantiations, these are separate elements. An attitude-describing feature can point in cardinal directions of one or more coordinate systems, such as north, up or down, or in other instantiations these features can point in other directions.

Observing a self-describing fiducial that also has at least one attitude-describing feature using an imaging system captures a projection of at least one component of the attitude-describing feature as measured at the sensor focal plane at a specific time. This observation, in combination with the communicated information about at least one component of the self-describing fiducial's own attitude, comprises the additional dimension or dimensions of information that the navigation estimation system uses to produce more accurate estimates of the navigation states of the navigating object.

In some examples, the attitude-describing feature is selected to maximize its effectiveness as an aiding source by increasing visibility, the ability of the navigating object to resolve the feature and/or the directionality of the feature. For example, in an urban canyon an enhanced self-describing fiducial with an attitude-describing feature that resides in a vertical plane provides increased accuracy related to the roll of the navigating object, which translates into improved roll control, and an associated reduction in the cross-track position error. As another example, an enhanced self-describing fiducial with an attitude-describing feature that resides in a horizontal plane below the navigating object provides improved yaw accuracy, which translates into improved heading control, and an associated reduction in the cross-track position error.

In another or in an alternative embodiment, the self-describing fiducial communicates not only its own position, but also at least one component of the look vector from the self-describing fiducial to the navigating object with respect to one or more coordinate systems using perspective-based information encoding. This comprises at least one additional dimension of navigation aiding information. In one example of this embodiment, the attitude-describing feature could be a pattern, barcode or QR type code wrapped or projected onto a cylinder or sphere. The navigating object can only observe a portion of the complete matrix barcode or pattern that is visible from its particular perspective. The barcode is designed such that the portion of the barcode visible from the particular perspective communicates at least one component of the look vector from the self-describing fiducial to the navigating object with respect to one or more coordinate systems. Navigating objects in the vicinity can extract a more powerful navigation measurement from a single observation of the self-describing fiducial due to this additional information.

Figure 7:
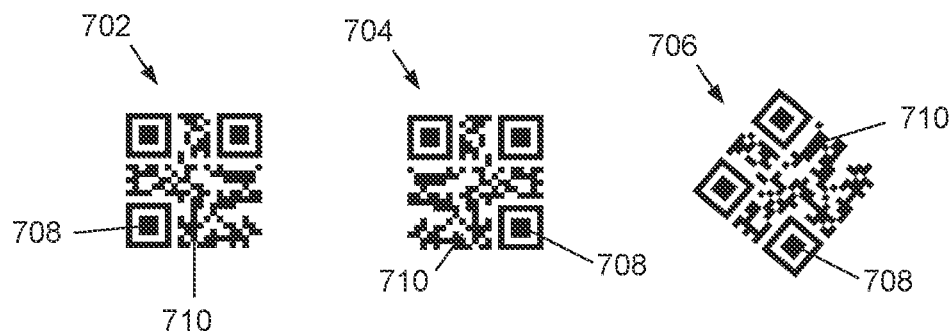
FIG. 7 shows several examples of self-describing fiducials that include additional information, according to one embodiment of principles described herein.

FIG. 7 illustrates alternative embodiments (702, 704, 706) where the self-describing fiducial communicates not only its own position via information in the barcode (710), but also at least one component of its own attitude with respect to one or more coordinate systems. This compromises at least one additional dimension of navigation aiding information. In this embodiment, the self-describing fiducials (702, 704, 706) are also enhanced with at least one associated attitude-describing feature (708) that is observable by navigating objects in the vicinity, indicating to a navigating object or objects at least one component of the self-describing fiducial's own attitude with respect to one or more coordinate systems. The self-describing fiducials (702, 704, 706) could include any number of associated attitude-describing features (708). These attitude-describing features may have any of a number of different characteristics such as shape, size, or type. In the example of (702), the associated attitude-describing feature (708) is comprised of a shape (708) located in the lower left hand corner, a shape (708) located in the upper left hand corner, and a shape (708) located in the upper right hand corner. The relationship between the position of the shapes (708) could communicate to navigating objects information regarding the self-describing fiducials (702, 704, 706) attitude with respect to one or more coordinate systems.

In one example, the self-describing fiducial (702) communicates not only its position using the barcode (710), but also communicates its orientation with respect to the ground using the associated attitude-describing feature (708). A navigating object could observe the associated attitude-describing feature (708) and then determine its own orientation and navigate in a desired direction. For example, the associated attitude-describing feature (708) could communicate to a navigating object which direction is vertical, and also communicate that the navigating object should turn right.

In another example, a self-describing fiducial (704) could communicate its position using the barcode (710), and the associated attitude-describing feature (708) could communicate to navigating objects which direction is vertical with respect to the ground. The associated attitude-describing feature (708) could also communicate to a navigating object that it should turn left.

In another example, a self-describing fiducial (706) could communicate its position using the barcode (710), and use the associated attitude-describing feature (708) to communicate to a navigating object that it should travel in a vertical direction.

Figure 8:
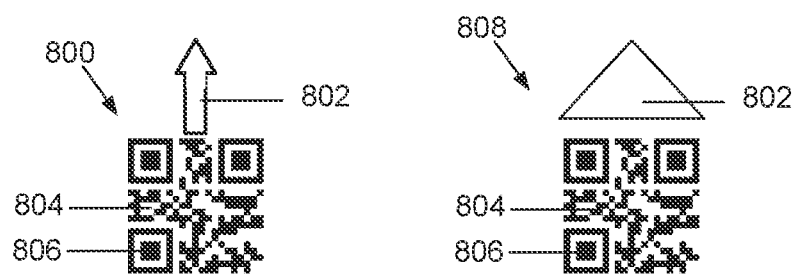
FIG. 8 shows several examples of self-describing fiducials that include additional information, according to one embodiment of principles described herein.

FIG. 8 shows a number of different embodiments (800, 808) that include an attitude-describing feature (802) that points in the vertical direction. This attitude-describing feature (802) can have a variety of different configurations, including the different arrows shown. The arrows or other attitude-describing features can be selected based on any number of criteria including high visibility for the navigating object and easy decoding of the intended information. As discussed above, the barcode (804) may or may not contain information describing the attitude-describing feature (802). For example, the barcode (804) could contain information relating to the location of the self-describing fiducial (800, 808) (e.g. latitude, longitude, altitude) and could additionally communicate that an attitude-describing feature (i.e. 802) is an arrow pointing in the upward (gravitational reference) direction. The attitude-describing feature (802)

could also be further described by the information communicated by the self-describing fiducial (800, 808). For example, the size, geometry, coloring, relative location with respect to the barcode (804), could reference to an already known shape library or decoding parameters/technique such as the Scale Invariant Feature Transform (SIFT). Other features, such as alignment marks (806) could also be present and supplement the information available to the navigating object.

Figure 9:
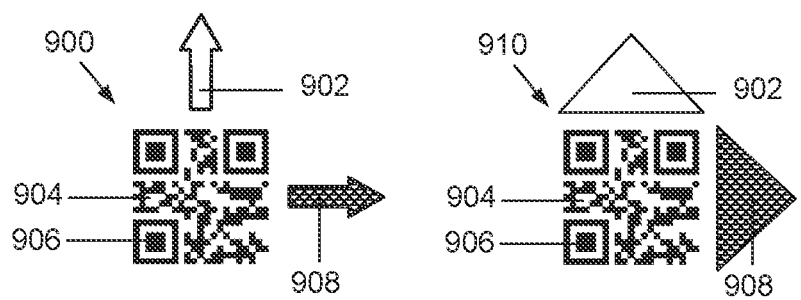
FIG. 9 shows several examples of self-describing fiducials that include additional information, according to one embodiment of principles described herein.

FIG. 9 shows two examples of a self-describing fiducial (900, 910) with multiple attitude-describing features (902, 908). In one example, the combination of arrows (902, 908) describe both the plane that the self-describing fiducial (900, 910) resides in and the orientation of the self-describing fiducial (900, 910) within the plane. In another example, the arrow (902) may describe the orientation of the self-describing fiducial (900, 910) while the additional arrow or geometry (908) could give additional information about the environment or the path of the navigating object. For example, the darker arrows (908) could indicate that an aerial path that the navigating object should follow is to the right of the fiducial (900, 910).

Figure 10:
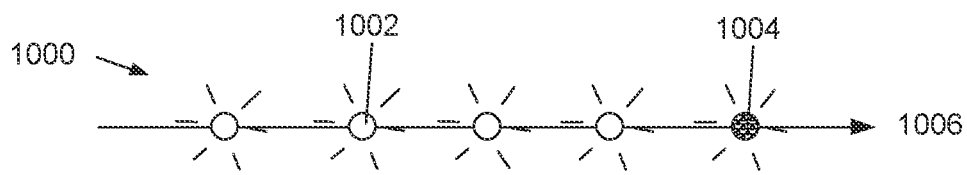
FIG. 10 shows one example of a self-describing fiducial that includes additional information, according to one embodiment of principles described herein.

FIG. 10 shows a self-describing fiducial (1000) that is made of LEDs (1002, 1004). In this example, the LEDs are aligned along an axis (1006). For example, there may be four LEDs (1002) with a first color, brightness, wavelength, or flashing pattern and a different LED (1004) with a different characteristic. In one embodiment, the self-describing fiducial (1000) could use the different LEDs (1004) to communicate both information regarding the position of the self-describing fiducial (1000) and the orientation of the axis (1006). In one embodiment, the self-describing fiducial (1000) could use the different LED (1004) to communicate to a navigating object information about a path the navigating object should follow. In a different embodiment, the self-describing fiducial (1000) could communicate information about the environment using the LEDs (1002, 1004). For example, when the different LED (1004) is flashing at a certain frequency, it could indicate to a navigating object that windy conditions are ahead, and when not flashing, indicate to a navigating object that calm conditions are ahead.

Figure 11:
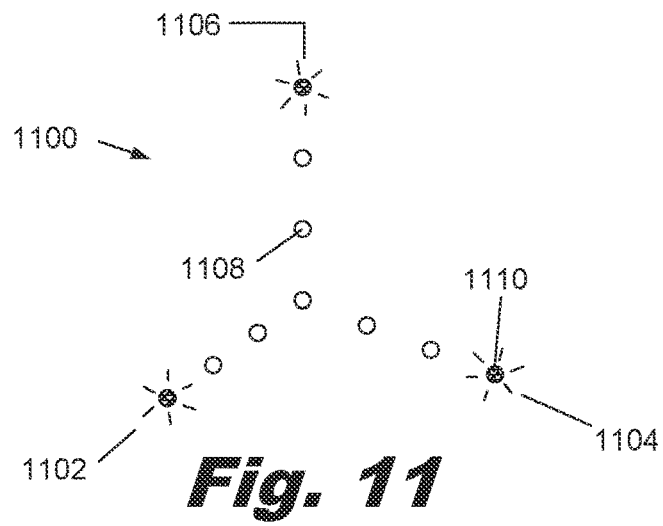
FIG. 11 shows one example of a self-describing fiducial that includes additional information, according to one embodiment of principles described herein.

FIG. 11 shows a self-describing fiducial (1100) that includes a number of LEDs (1108, 1110) arranged in a particular pattern. In this example the LEDs (or other object/light sources) are arranged along three axes (1102, 1104, 1106) which may be orthogonal. In one embodiment, the self-describing fiducial (1100) could be used to communicate a pathway a navigating object should travel. In another example, the self-describing fiducial (1100) could communicate information about the environment surrounding the self-describing fiducial (1100). For example, when certain LEDs are flashing, it could communicate the velocity and direction of wind in the area to a navigating object. The self-describing fiducial (1100) could also be used to determine the orientation of the navigating object with respect to the self-describing fiducial (1100) in three directions. In another example, the self-describing fiducial (1100) could communicate information about aerial traffic to a navigating object so that the navigating object could adjust its flight pattern accordingly. In one example, when an LED (1110) along a certain axis is flashing, it could communicate to a navigating object that another object is coming towards the self-describing fiducial (1100) at a certain angle in relation to the axes (1104, 1102, 1106).

Figure 12:
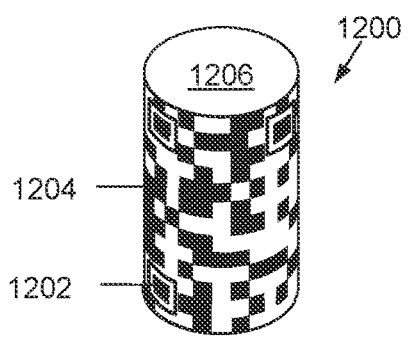
FIG. 12 shows one example of a self-describing fiducial that includes additional information, according to one embodiment of principles described herein.

FIG. 12 shows a self-describing fiducial (1200) that can be made up of a geometric shape. In this example, the geometric shape is a cylinder (1206) with a matrix barcode (1204) wrapped around the perimeter and various alignment marks (1202) on the barcode (1204). This self-describing fiducial (1200) could be used in a variety of ways including perspective-based information encoding where the self-describing fiducial communicates an angular "look" direction that tells navigating objects from which direction they are approaching/looking at the fiducial (1200).

Figure 13:
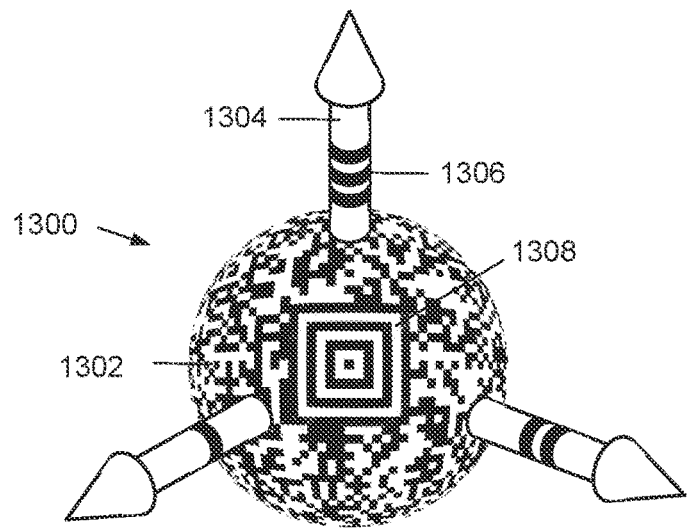
FIG. 13 shows one example of a self-describing fiducial that includes additional information, according to one embodiment of principles described herein.

FIG. 13 illustrates yet another embodiment, where a self-describing fiducial (1300) is enhanced to communicate both: 1. at least one component of its own attitude and has at least one associated attitude-describing feature (1304), and 2. at least one component of the look vector from the self-describing fiducial (1300) to the navigating object using perspective-based information encoding. This comprises the additional dimensions of information that the navigation estimation system uses to produce more accurate estimates of the navigational state of the navigating object. In some instantiations of this embodiment, a single observation of such an enhanced self-describing fiducial (1300) can provide the navigating object with a measurement containing information regarding all position and attitude states. This can enable the navigating object to produce a more accurate navigation state estimate.

For example, the self-describing fiducial (1300) may include information that communicates its identifier/location. This may take a variety of forms including the multidimensional barcode (1302) shown on the outer surface of the sphere or any appropriate form. In one embodiment, the information communicated could be dependent on the direction the self describing fiducial was imaged from. This could allow the navigating object observing the self-describing fiducial to determine what angle it is approaching the self-describing fiducial from. Additionally, the information in the multidimensional barcode (1302) may communicate characteristics of additional features present, how to interpret/identify the features, information communicated by the features, applicability of the information, etc. In one embodiment, the size of the sphere may be communicated or predetermined. Thus, the apparent size of the sphere on the navigating object's sensor can give an estimate of the distance between the self describing fiducial and the navigating object.

In this example, the self-describing fiducial (1300) also includes an alignment or registration mark (1308) that can be used for a variety of purposes, including communicating a range-to-target, perspective based information, and/or work in combination with other components of the self describing fiducial. The self-describing fiducial (1300) in this example also includes three orthogonal arrows (1304) that are uniquely identifiable by bands (1306). This may allow the navigating object to directly observe its look vector from a single observation, the orientation of the fiducial, and its own orientation with respect to the fiducial.

In general, self-describing fiducials may communicate more than their location. For example, they may indicate their orientation with respect to one or more coordinate systems or objects. They may communicate directionality/identification of a path, location of obstacles or hazards, traffic conditions, a landing point, a charging station and/or environmental conditions. They may indicate actions that the navigating object should take (turn left, right, do not enter, warning, caution, yield, stop, etc.).

In many instances, different navigating objects may need to follow different paths. In one embodiment, a self-describing fiducial could communicate information about what type of navigating object should follow a certain path. For example, a self-describing fiducial could communicate that heavier navigating objects should travel at a higher altitude, but that lighter navigating objects should travel at a lower altitude. In another example, a self-describing fiducial could communicate that a certain type of navigating object should turn left, but that a different type of navigating object should turn right. In another example, a self-describing fiducial in windy conditions could communicate that lighter navigating objects need to land, and communicate that heavier navigating objects could proceed.

In another embodiment, a self-describing fiducial could be encoded so that only specific navigating objects equipped with the decoding information could receive information from the self-describing fiducial. This could help prevent fraudulent use of self-describing fiducials to misdirect or misinform navigating objects.

In another example, navigating objects could be configured to communicate only with self-describing fiducials that contain a unique identifier. For example, navigating objects going to a certain destination would only communicate with self-describing fiducials that lead to that destination, while navigating objects going to a different destination would communicate with different self-describing fiducials that lead to a different destination.

As discussed above, one example of a system of self-describing fiducials provides positional information to nearby navigating objects. One potential application of such a system is to support the navigation of objects such as unmanned aerial vehicles (UAV) in metropolitan areas, for the purposes of package delivery, air taxis, etc. An important factor in the flight of an UAV is the state of the surrounding air flow. The air flow through metropolitan areas exhibits stratification and high levels of vorticity and turbulence. For example, due to their relatively small mass and inertia, Group 1 (0-20 lbs) and Group 2 (21-55 lbs) UAVs are particularly susceptible to unexpected or adverse flow fields. Other UAVs or other navigating objects can also be influenced by unknown flow fields to varying degrees. As aerial highways become more congested, the lack of knowledge of these dynamic flow fields will result in greater uncertainty in the flight path of navigating objects and an associated increased risk of collision amongst navigating objects. In addition to safety concerns, adverse (or opposing) flow fields increase drag on the UAV or navigating object, resulting in shorter flight times and less efficient package or passenger delivery.

Figure 14:
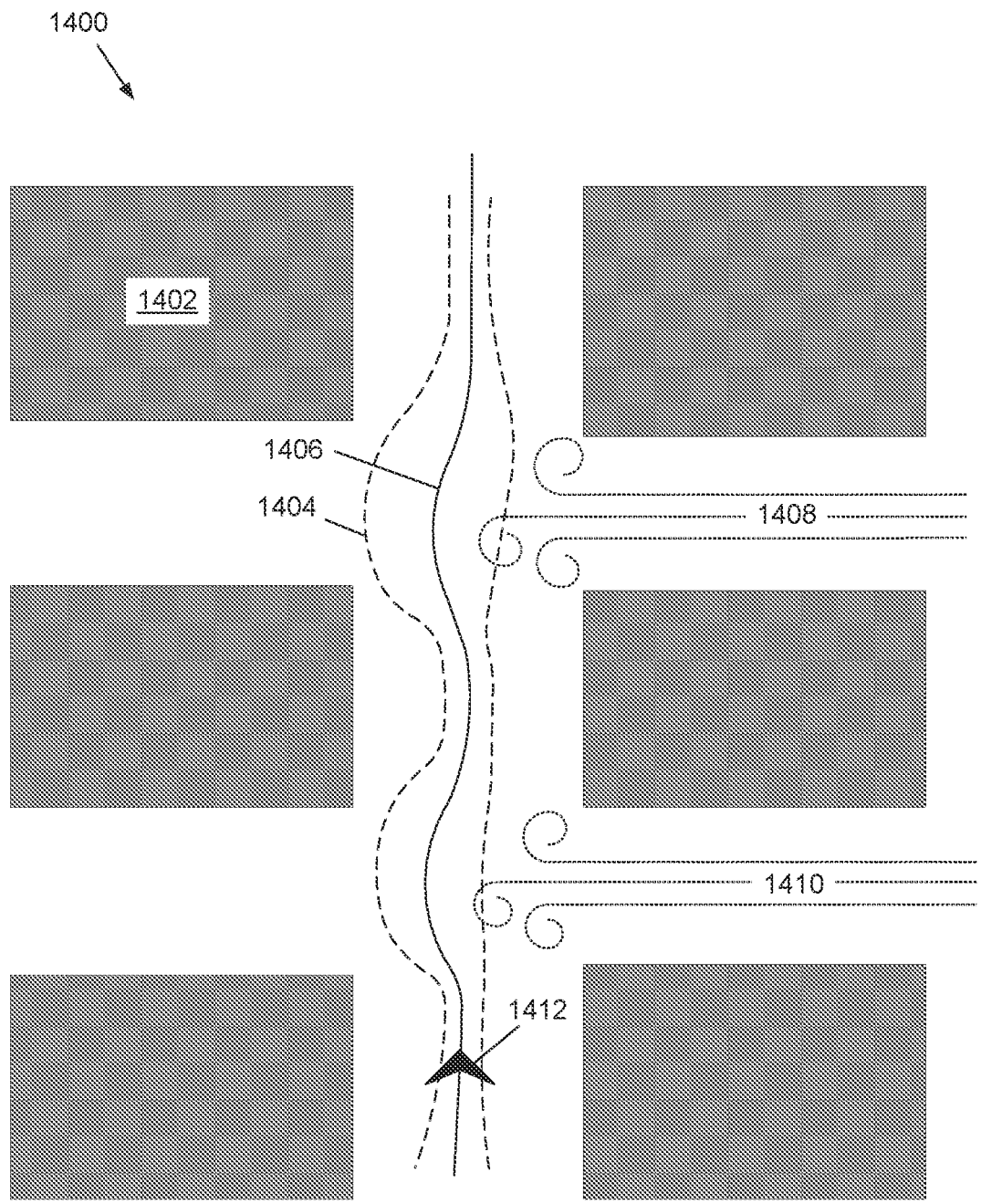
FIG. 14 shows a navigating object passing through a flow field in an urban landscape, according to one example of principles described herein.

FIG. 14 shows an urban landscape (1400) with a navigating object (1412) traveling through a simplified flow field in an area that is dominated by a number of buildings (1402) with spaces between them. While the desired path of the navigating object (1412) is centered between buildings, the mean path (1406) is offset due to aerodynamic forces caused by the adverse air flow from right to left (1408, 1410). The uncertainty envelope/position dispersion (1404) of the navigating object's path also increases due to the variability of the flow field.

Knowledge of the flow field enables more intelligent path planning by compensating for its effect, both from a safety as well as an efficiency perspective. For example, efficiencies may be gained in energy and time. These efficiencies may include an increase in the number of packages delivered, shorter flight times, longer endurance, less energy expended in a given flight path, more optimal flight path planning, lower uncertainty in position dispersion, better collision avoidance, ability to fly in tighter flight formations, etc. This can be achieved by exploiting knowledge of the flow field for the routing of a vehicle or vehicles, avoiding periods of heavy adverse flow, or routing vehicles with low power levels/bulky payloads through areas with less adverse flow.

Other illustrative embodiments may include a path planner that exploits knowledge of the flow field and associated uncertainty to safely direct traffic of navigating objects with sufficient space around each object to maintain the risk of collisions below a specified threshold. The path planner may be part of a navigating object(s), a self-describing fiducial(s) or a centralized entity. For example, an air traffic control entity may use flow field knowledge to maintain safe spacing between navigating objects, by compensating for the effects of the flow.

Figure 15:
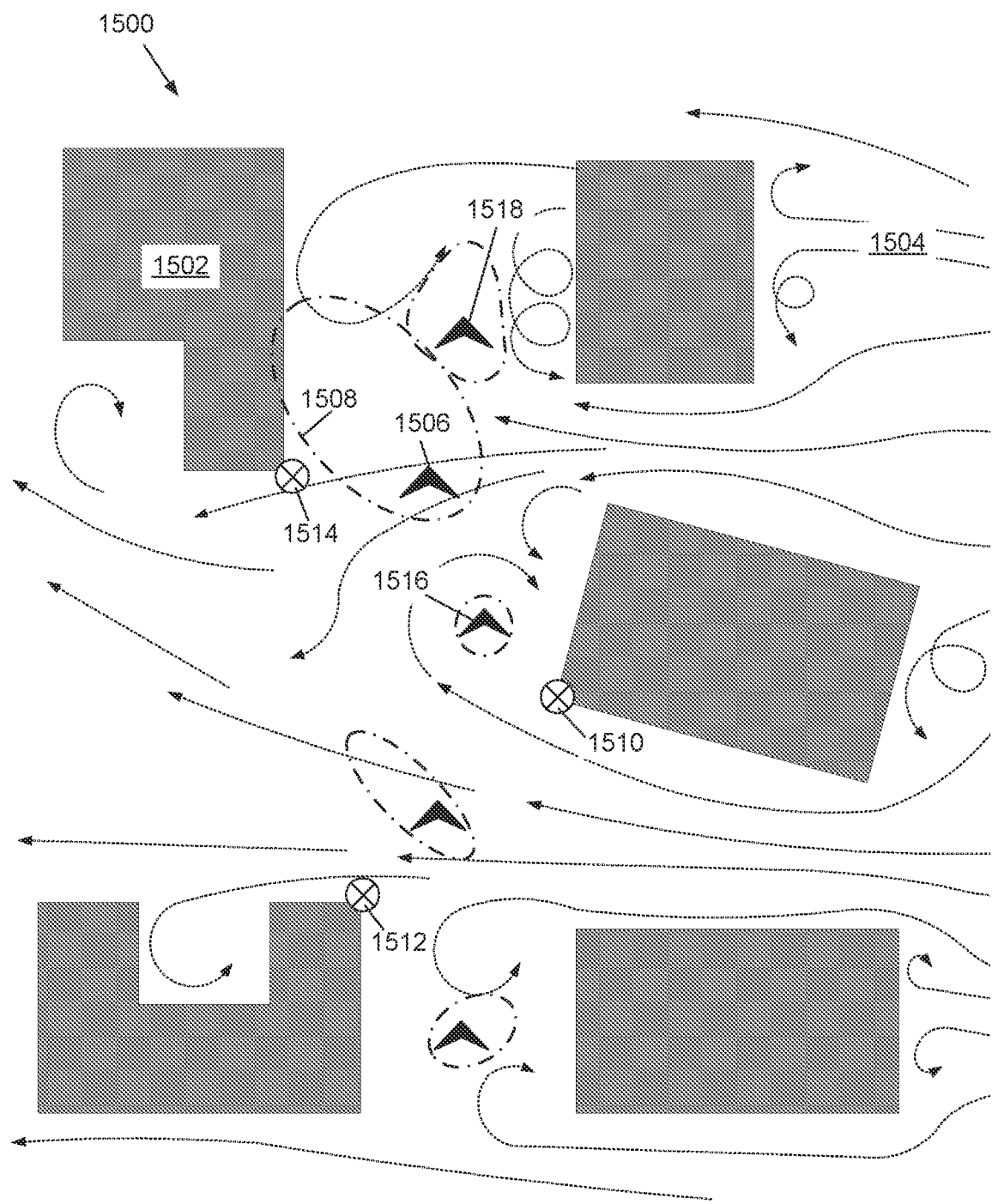
FIG. 15 shows navigating objects passing through a flow field in an urban landscape, according to one example of principles described herein.

FIG. 15 shows a more complex flow field (1504) that passes through a number of buildings (1502). In this example, there are multiple navigating objects (i.e. 1506, 1516) traveling along an aerial path between buildings (1502). There are a number of self-describing fiducials (1510, 1512, 1514) along the path. In this example, the wind/flow field (1504) is blowing from the right to left. The buildings (1502) and other obstructions influence the flow field (1504) and produce spatial and temporal variations in the speed and direction of the flow. For example, when the flow is constrained to pass between buildings, the flow may be accelerated. As the flow hits a building there may be stagnation points near the building on the windward side. There may also be turbulence or vortices on the lower pressure surfaces (i.e. the lee side of buildings). This results in a complex flow field that varies spatially and over time. For example, in areas with turbulence, the wind can quickly change directions and intensities. These changes in flow direction and speed can disturb/disrupt navigating object travel.

In FIG. 15, there are five navigating objects (including 1506, 1516) passing through the area (moving from the bottom to the top of the page) through the opening between buildings. The goal is for these navigating objects to efficiently travel along a designated path(s) with adequate clearance between themselves and their surroundings. They need to avoid stationary objects (such as buildings and poles), quasi stationary objects (such as trees and swinging power lines), and moving objects (such as other navigating objects, humans, birds, etc.). However, due to changing flow conditions, there may be a relatively large uncertainty in the conditions and path that the navigating objects will take. Each navigating object in FIG. 15 shows a dashed-dotted shape surrounding it that describes the uncertainty. This dash-dotted shape grows larger when there are higher flow variations. For example, a first navigating object (1506) may be relatively lightweight and travelling in an area with high speed and/or more variable flows. This results in a greater uncertainty in its ability to control its position as indicated by the relatively large uncertainty envelope (1508). When the uncertainty envelope of a navigation object is far from a building or another navigating object, the risk of collision is low. The more the uncertainty envelopes overlap with adjacent objects/uncertainty envelopes, the higher the chance of collision.

For example, the uncertainty envelope (1508) impinges on both a building (1502) and the uncertainty envelope of a neighboring a navigating object (1518). This means that there is a risk that the navigating object (1506) may collide with either (or both) the building and the navigating object ahead of it. This situation could have been avoided if the navigating object (1506) had positioned itself better in the space before entering the flow (i.e. a greater following distance behind the navigating object (1518) ahead of it and/or moved farther to the right, slowed down, etc.) or had taken an alternative route (i.e. change altitude, follow a different path with less concentrated flow, etc.). However, this presupposes that the navigating object (1506) knew about the real time/predicted flow characteristics in its vicinity in advance, and appropriately adjusted its trajectory to compensate.

In contrast, the second navigating object (1516) has a small uncertainty oval. This may be for any number of reasons, including but not limited to the following: the navigating object (1516) may be heavier, more powerful, and/or better aerodynamics and consequently is less impacted by external flows, the navigating object (1516) may be in a slower area of the flow (i.e. in the center of an eddy, or lower to the ground), or some other reason.

The navigating objects may receive advanced notice of the flow characteristics from the self-describing fiducials (1510, 1512, 1514). For example, in addition to communicating their location, the self-describing fiducials may communicate additional information such as local characteristics of the flow. FIGS. 16-20 show a number of illustrative examples of self-describing fiducials that could measure or obtain information about flow fields in their proximity. Returning to FIG. 15, the location of the self-describing fiducials (1510, 1512, 1514) may be selected to make the relevant measurements of the flow field (1504) and to be visible to vehicles or navigating objects that will encounter the flows.

In the example shown in FIG. 15, the self-describing fiducial (1514) may have been visible to the navigating object (1506) prior to the navigating object encountering the high velocity cross wind between the buildings (1502) that is threatening to blow the navigating object (1506) into the building to the left. The self-describing fiducial (1514) could make a wind measurement and communicate to the navigating object (1506) the direction and velocity of the flow. In some examples, the self-describing fiducial may only measure the flow in its location and the flow field in the intended path of the navigating object may need to be calculated/modelled/extrapolated. This can be relatively straightforward because the calculation/model could be calibrated each time a navigating object passes through the area. In other examples, the self-describing fiducial may directly measure the flow velocity along the navigating object's intended path (see e.g. the ultrasonic/radar wind sensor (1802) shown in FIG. 18), or the self-describing fiducial may receive (additional) information from external sources (such as wireless transmissions from other navigating objects (e.g. FIG. 20) or from other weather services).

However, even if the self-describing fiducial (1514) was not visible to the navigating object (1506), the information from the other self-describing fiducials (1510, 1512) along with models/previous experience could be used to predict the flow in the proximity of the self-describing fiducial (1514). For example, only one of the self-describing fiducials (1510, 1512, 1514) may include an airspeed sensor, while the other fiducials may include an orientation vector, a wind direction sensor, or other sensor/feature.

FIGS. 16-20 illustrate embodiments of self-describing fiducials augmented with airspeed information such as the velocity, direction, and temporal variations of the flow. This information can serve a number of purposes, including building/using a model to estimate flows along a path or in the vicinity of a vehicle. The fidelity of the model varies by application and may include models based on laminar potential flow or computational fluid dynamics. The flow model and/or path planner could be a centralized node in a network with greater computational power and/or connectivity than other nodes, or the flow model/path planning could be done in a more distributed manner, with each node focusing on the computations that are more relevant to its locale and/or predicted path. These calculations of the flow field could include models of cities/buildings and weather models to create an estimate of the flow field. Point measurements made by the self-describing fiducials can be used to create/improve the flow field model/calculation and/or can be used to improve an existing flow field estimate.

Given the envisioned ubiquity of the self-describing fiducial system, knowledge of the flow field can be aided by augmenting each self-describing fiducial with flow field sensors. Point measurements of the flow serve as reference points in a large-scale flow field model. Given an aerodynamic model of the navigating object and knowledge of its navigation and control algorithms, the mean path and the associated uncertainty envelope of the navigating object can be predicted prior to the actual flight, as illustrated in FIGS. 14 and 15. Energy expenditure along the path due to drag, lift, etc. can also be predicted. As is the case in flow field modeling, methods for predicting the uncertainty envelope and energy expenditure vary in complexity, ranging from efficient closed-loop linear covariance analysis to high-fidelity Monte Carlo analysis or other suitable computational algorithms.

To ensure safe travel of large numbers of navigating objects, the self-describing fiducial system can direct the traffic of navigating objects in such a way that separation distances between objects meet a specified probability of collision. It is important to note that the required separation depends on the size of the uncertainty envelope, which in turn depends on the flow field, aerodynamics, and the navigation estimation and guidance algorithms of each navigating object.

The self-describing fiducial may take a wide variety of forms, including a self-describing fiducial that communicates a wind vector, an energy cost for navigating the region, a suggested path modification, or some other data. In one embodiment, the self-describing fiducial communicates the parameters of the flow field along the navigating object's intended flight path. With this information, a navigating object can prepare so that the flow field doesn't negatively affect its performance. For example, the navigating object can make calculations using a model of its own performance to modify its flight path/parameters. The navigating object may alter its flight path to pre-position itself so a cross wind doesn't undesirably cause the navigating object to leave the flight corridor. Alternatively, the navigating object may adjust its height so that it is traveling at a lower altitude with calmer winds.

In another example, the self-describing fiducial may communicate a mean flow vector and a standard deviation of the flow. Additionally or alternatively, the self-describing fiducial may communicate a gradient or a derivative of the flow and/or a wind vector flow field. In one embodiment, the intended path of the navigating object may be known by the self-describing fiducials. The self-describing fiducial may be located near one or more predetermined flight corridors that the navigating object is traveling along and consequently may understand the predicted flight path of the navigating object. The navigating object may calculate a flight path and may communicate that flight path to the self-describing fiducial/system.

In cases where the intended/predicted flight path is known, the flow field may be calculated along the flight path. For example, the self-describing fiducial system may provide the mean flow at points along the intended path. Additionally, one or more elements in the system may calculate a wind vector flow field. For example, a self-describing fiducial may calculate the flow field value at grid points around its location for 100 meters and communicate this information to the navigating object. The navigating object may then apply this data to improve its performance as described above. The grid may be two dimensional or three dimensional and may contain scalar values at points in the grid or may include vectorized information. As discussed below, where there is relatively dense traffic of navigating objects, the navigating objects may act as mobile sensors that detect wind and other conditions and may communicate this information to one or more nodes in the system. In some examples, the flow field modeling and other calculations could be performed by one or more centralized nodes. These nodes could distribute relevant information from the models to nodes that could utilize the information. For example, a flow field is predicted based on a model of the city geometry, weather predictions, measurements from self-describing fiducials and other parameters may be combined with navigating object flight path and other vehicle traffic patterns to generate optimized system performance. In one embodiment, knowledge of the flow field, aerodynamics, and navigation estimation and guidance algorithms may be used to select paths which minimize the energy usage of navigating objects with limited resources for propulsion or large payloads.

Figure 16:
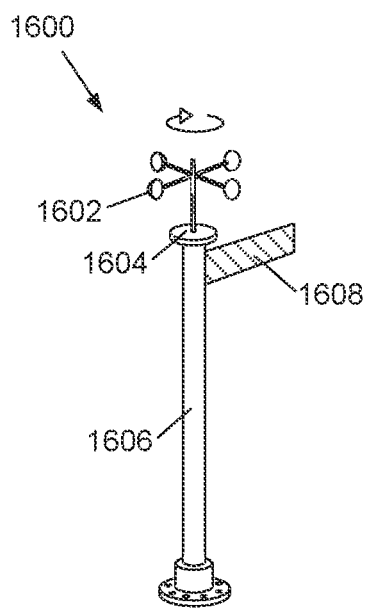
FIGS. 16-20 show various examples of self-describing fiducials that include additional information, according to embodiments of principles described herein.
Figure 17:
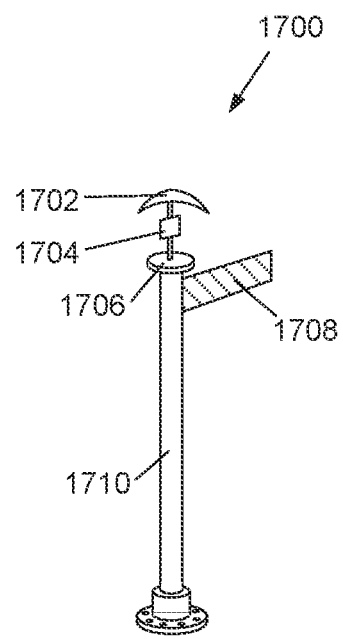

FIGS. 16, 17, 18 and 19 illustrate various sensors that could be used to sense flow fields in the vicinity of the self-describing fiducial. The sensors could be various shapes, sizes and use a variety of techniques to measure/sense relevant parameters. FIGS. 16 and 17 show self-describing fiducials (1600, 1700) that include an airspeed sensor (1602, 1702/1704) with one or more sensitive axes that could be used to sense flow fields in the vicinity of the self-describing fiducial (1600, 1700). FIG. 16 shows a self-describing fiducial (1600) that includes a mount and a pole (1606) with a directional element (1608), a self-describing fiducial (1604), and a cup anemometer (1602) which measures wind speed in the horizontal plane. This sensor produces a point measurement of airspeed which serves to improve the accuracy of a model of the flow field. FIG. 17 shows augmentation of the self-describing fiducial (1700) with an aerodynamic lifting surface (1702) mounted to a load cell (1704). As the air passes over the lifting surface (1702), it produces forces which are measured by the load cell (1704). Lifting line theory (or other appropriate theory/computational method) is then used to relate the measured forces to vorticity of the flow, which in turn is used to predict the aerodynamic forces acting on nearby navigating objects.

Figure 18:
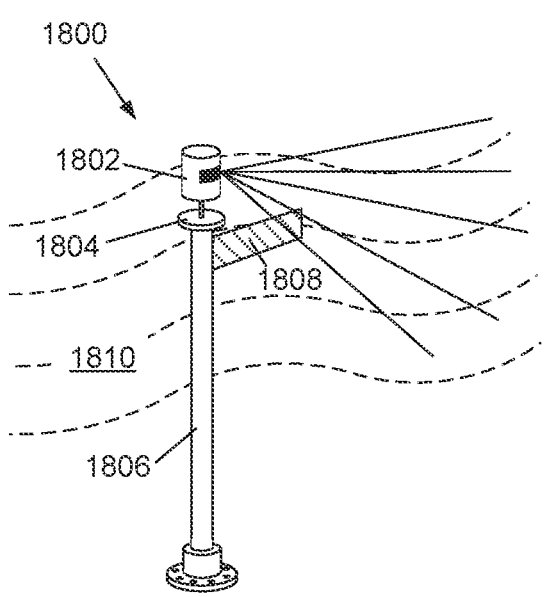
Figure 19:
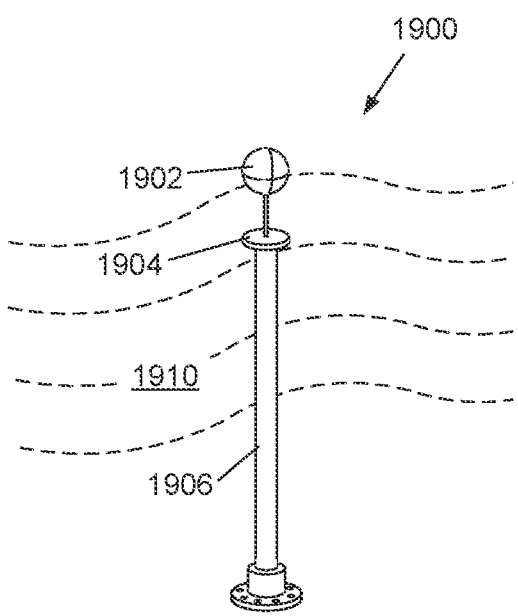

FIG. 18 illustrates augmentation of the self-describing fiducial (1800) with a doppler lidar (1802) wind measurement system, which provides measurements of wind velocity throughout the flow field area or volume (1810). In FIG. 19, the self-describing fiducial (1900) is augmented with a three-dimensional ultrasonic anemometer (1902), which measures a three-dimensional wind vector representing the flow field (1910). The above examples include examples of mounting hardware (1606, 1710, 1806, 1906), directionality features (1608, 1708, 1808), and elements designed to communicate location information (1604, 1706, 1804, 1904). In this example, the element designed to communicate the location of the self-describing fiducial is illustrated as a disk, but could have any number of shapes or embodiments, including those shown above in FIGS. 3A, 3B, 3C, 3D, 7, 8, 9, 10, 11, 12, 13. The element designed to communicate location may be of any appropriate size and have any of a number of features.

Figure 20:
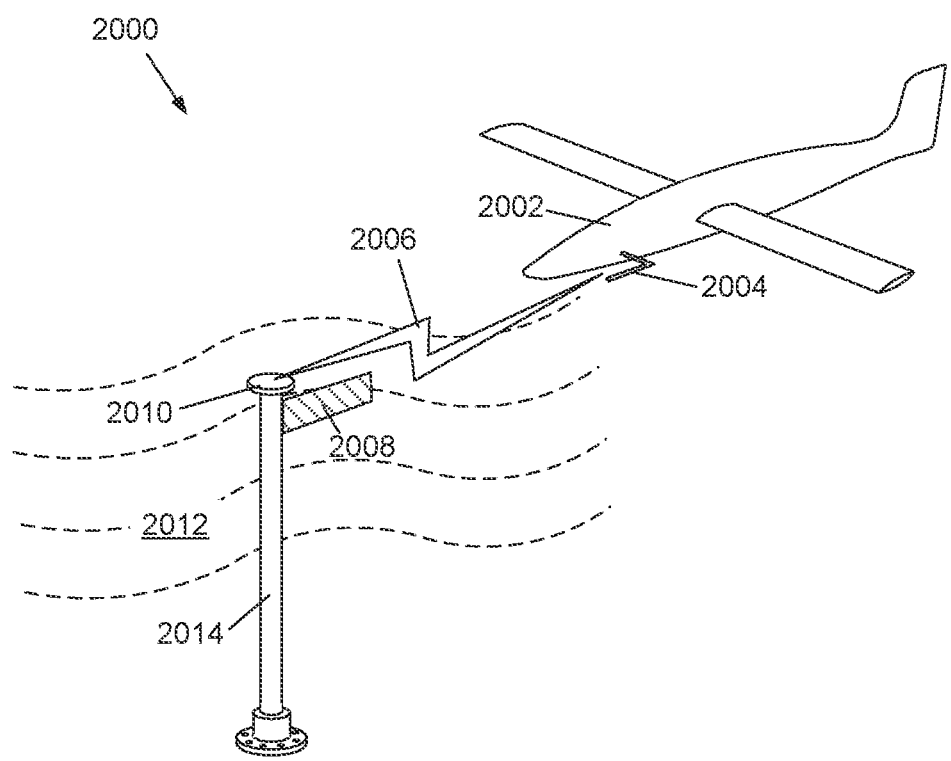

These are only a few examples of sensors and self-describing fiducials that could be used to measure flow fields throughout an aerial highway, further improving the fidelity of the large-scale flow field model and/or efficiency of navigating objects while traveling. A variety of other sensors, systems, architectures, computational implementations, network configurations, etc. could be used. For example, as illustrated in FIG. 20, the navigating objects (2002) themselves may be used to transmit estimates (2006) of the flow field (2012) as sensed via onboard sensors (2004) (such as pitot tube and static sensors) or derived from other parameters such as energy expended, flight corrections, accelerations experienced, models of the flight parameters/characteristics of the navigating object (2002), and/or other appropriate parameters/models. For example, the navigating object's airspeed combined with the ground speed estimates from the object's navigation system can provide an estimate of wind speed at the location of the navigating object (2002). Alternatively, the wind speed can be estimated by combining information in an aerodynamic model of the navigating object (2002), propeller thrust, and ground speed estimates from the navigation system. The wind speed information is transmitted to the self-describing fiducial system (2000) to improve the model of the overall flow field. As discussed above the self-describing fiducial system (2000) may include a variety of elements, including a mount (2014), a directionality component (2008), a feature that communicates its location (2010), etc. The self-describing fiducial system (2000) may be in communication with a variety of different components and networks.

The supplementary information may be communicated in any appropriate way, including one-way communication from a self-describing fiducial to navigating objects, through two way communication between one or more self-describing fiducials and navigating objects or through networked communication that distributes information between the nodes, where the nodes may include self-describing fiducials, navigating objects, other navigating objects, satellites, stationary objects/infrastructure, etc. The supplementary information may be communicated in a variety of ways, including but not limited to communicating optically, through any of a number of wireless protocols, general broadcast, or other methods.

Figure 21:
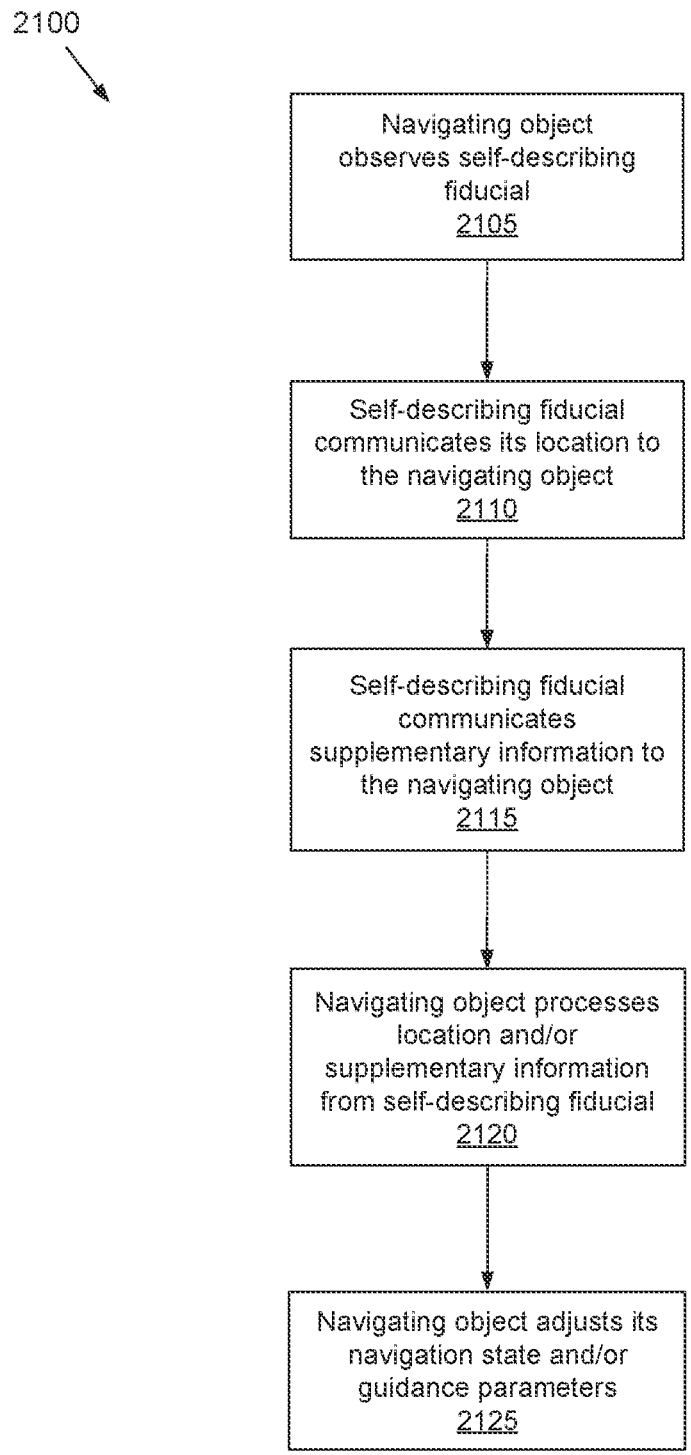
FIGS. 21-23 are flowcharts that describe various methods for navigation using self-describing fiducials, according to embodiments of principles described herein.

FIG. 21 shows a method (2100) of navigation using self-describing fiducials. In one embodiment, a navigating object can observe a self-describing fiducial in its vicinity (step 2105). The self-describing fiducial may then optically communicate its position/location to the navigating object (step 2110). In addition, the self-describing fiducial could communicate supplementary information to the navigating object (step 2115). The navigating object could then process the location of the self-describing fiducial and/or any other supplementary information (step 2120) and make adjustments to its navigation states and/or guidance parameters (step 2125).

Figure 22:
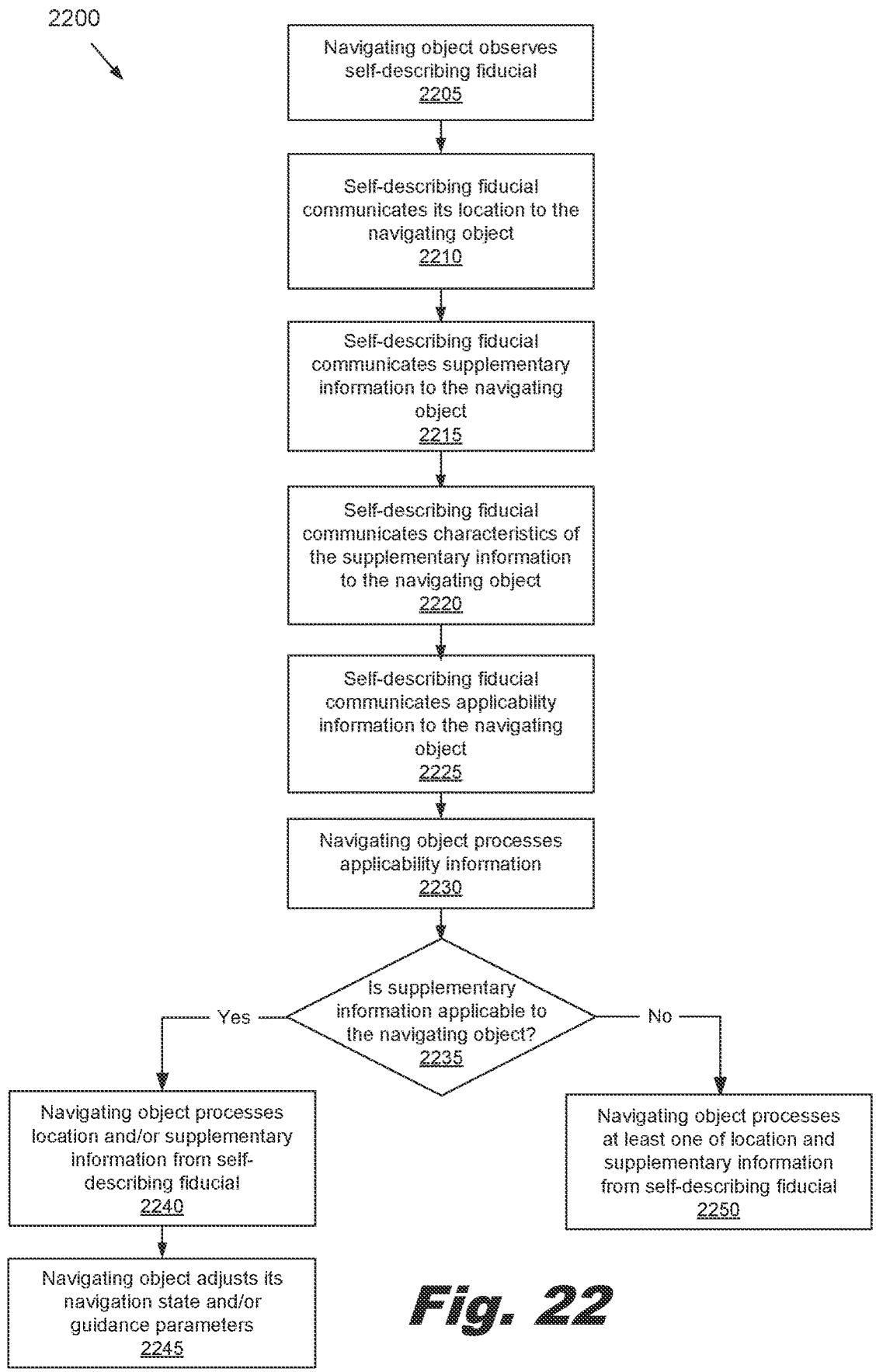

FIG. 22 shows a method (2200) of navigation using self-describing fiducials in which the self-describing fiducial could communicate information about the applicability of the supplementary information, and/or additional characteristics of the supplementary information. In this example, a navigating object could observe a self-describing fiducial in its vicinity (step 2205). The self-describing fiducial could then communicate its location and/or supplementary information to the navigating object (steps 2210, 2215). The self-describing fiducial could also communicate additional characteristics about the supplementary information to the navigating object (step 2220), such as the format or units of the information. The self-describing fiducial could also communicate applicability information to the navigating object (step 2225), which could inform the navigating object which objects the supplementary information applies to. The navigating object could then process the applicability information to determine if the supplementary information is applicable to the navigating object (step 2230). If the supplementary information is applicable to the navigating object (step 2235), the navigating object could process the location and/or supplementary information (step 2240), and could make changes to its navigation state and guidance parameters (step 2245). For example, a navigating object could receive information from a self-describing fiducial that high winds are ahead, and applicability information that the high winds will most likely affect lightweight or bulky objects. The navigating object could determine (step 2235) that, because of its shape, this information is not applicable to it, and therefore not adjust its guidance parameters (step 2250).

Figure 23:
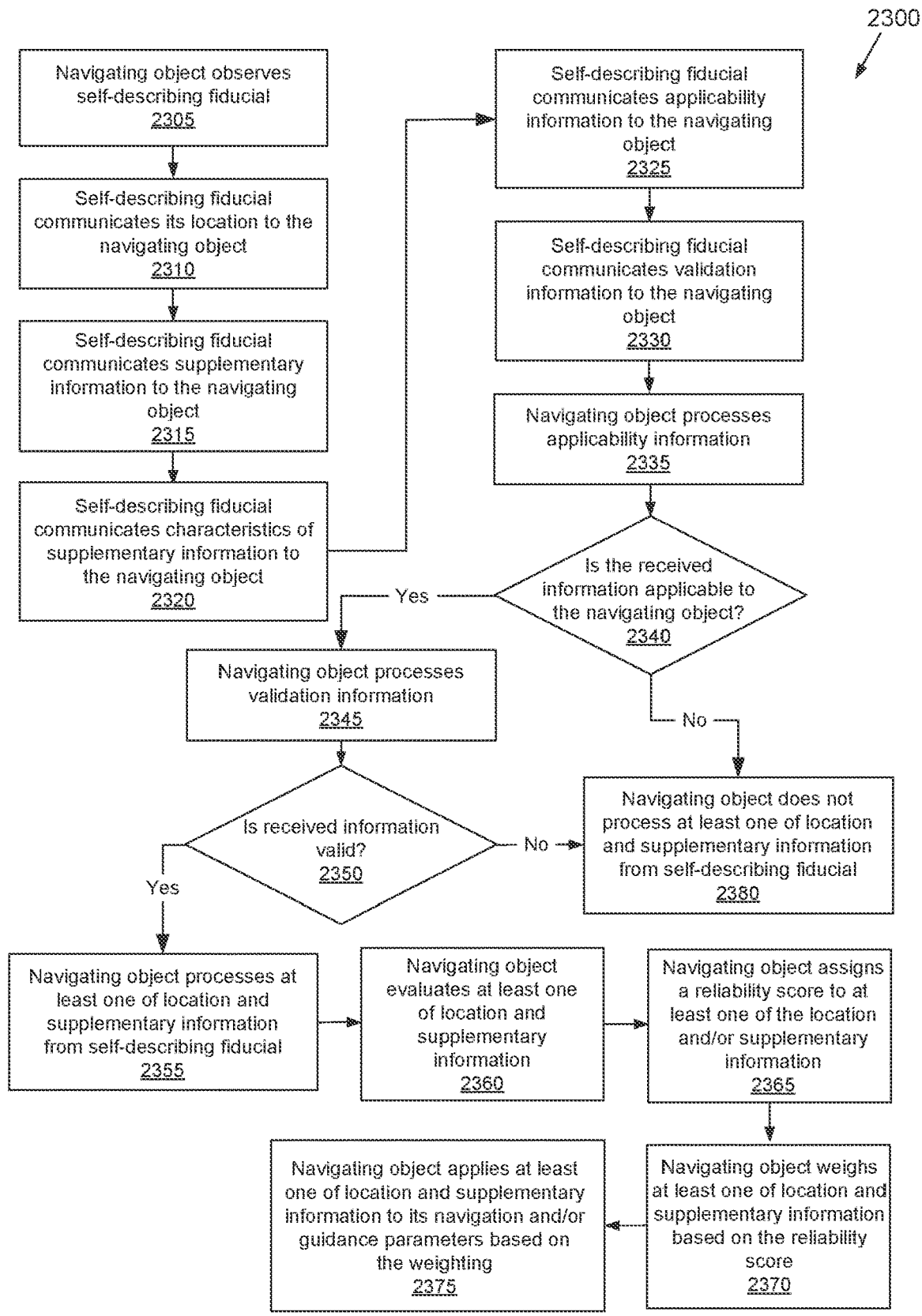

FIG. 23 shows an additional method (2300) for navigation using self-describing fiducials. In one example, the navigating object observes the self-describing fiducial (step 2305) and the self-describing fiducial communicates its location to the navigating object (step 2310). The self-describing fiducial may also communicate: supplementary information to the navigating object (step 2315), communicate the characteristics of the supplementary information to the navigating object (step 2320), and communicate applicability information (step 2325). The self-describing fiducial may also communicate validation information to a navigating object confirming that the self-describing fiducial's location and supplementary information can be trusted by the navigating object (step 2330). For example, the validation information could confirm that the location and supplementary information are from a trusted source, are up to date, and/or have not been fraudulently changed. The navigating object processes the applicability information (step 2335) and using the outcome of this processing determines if the received information is applicable to it (step 2340).

If the information is applicable ("Yes" step 2340), the navigating object processes validation information (step 2345) and determines if the received information is valid (step 2350). If this determination ("No" step 2350) or the previous determination ("No" step 2340) the navigating object does not process at least one of the location and supplementary information from the self describing fiducial (step 2380).

If the received information is both applicable and valid, the navigating object processes at least one of the location and supplementary information from the self-describing fiducial (step 2355). Based on the validation information, the navigating object could determine if it should adjust its navigation state and guidance parameters (step 2375). For example, a navigating object could receive validation communication from a self-describing fiducial that it was created by a certain organization, and supplementary information to turn left. If the navigating object is associated with that organization, it would incorporate the supplementary information and turn left. However, if the navigating object was not associated with the organization, it would not process the supplementary information and would continue its original course.

In another embodiment, based on information known by a navigating object, the navigating object could evaluate the reliability of information received from a self-describing fiducial (step 2360). The navigating object could then assign a reliability score to the information from the self-describing fiducial (step 2365), weigh the information based on the reliability score (step 2370) and adjust its navigation state and guidance parameters based on the weighting of the information (step 2375). For example, if a navigating object receives information from a self-describing fiducial that high winds are ahead, but this information contradicts information from instruments onboard the navigating object or information from other self-describing fiducials in the area, the navigating object could assign a low reliability score to the information and only adjust its navigation state and guidance parameters slightly. However, if the information from the self-describing fiducial is consistent with the onboard instruments, the navigating object could assign a high reliability score to the information and incorporate it by making large adjustments to its navigation state and guidance parameters.

Additionally or alternatively, a navigating object could calculate the confidence level of the information that it receives from a self-describing fiducial. For example, if a self-describing fiducial communicates a location that is extremely different from what is expected or is different from what other self-describing fiducials in the area are communicating, a navigating object could place low confidence in the information and disregard it. In another example, a self-describing fiducial that has been accurately surveyed communicates its position with an associated low position uncertainty. The navigation object receives this navigation aiding information and reliability score, and appropriately adjusts its navigation state given the communicated reliability of the navigation-aiding information.

Thus, in one example of principles described herein, a self-describing fiducial may include a communication element that is configured to optically communicate navigation state estimation aiding information to one or more navigating objects in the vicinity of the self-describing fiducial. The navigation-aiding information may include a geographic position of the self-describing fiducial with respect to one or more coordinate systems. The communication element may be further configured to communicate supplementary information describing a spatial relationship between the self-describing fiducial and the surrounding environment.

The supplementary information may include at least one of additional navigation-aiding information and guidance-aiding information. The geographic position may include a three dimensional position. The supplementary information may include an external directionality of a feature of the self-describing fiducial. For example, the supplementary information may include attitude of the self-describing fiducial with respect to one or more coordinate systems, wherein the attitude information comprises at least one of: cardinal directions, compass heading, true north, magnetic north, path direction, zenith directionality, nadir directionality and a gravitational orientation. The self-describing fiducial may be enhanced with an associated observable attitude describing feature comprising at least one of: an oriented matrix barcode, an arrow, a triangle, a row of lights, a matrix barcode wrapped on a cylinder, a matrix barcode on a sphere or other appropriate feature or geometry that conveys directionality or attitude.

The supplementary information may also include at least one of perspective-based information and range to target. In one example, the supplementary information may include at least one of a point measurement of wind speed in one or more directions, a volumetric measurement of wind speed in one or more directions, the force generated by wind on a feature of the self describing fiducial, an in situ wind measurement produced by a navigating object in the vicinity of the self describing fiducial. The supplementary information may include a spatial guidance command, such as indicating a turn, an altitude, a caution to avoid an obstacle, a speed vector, or other spatial instructions or warnings.

The communication element may include a first optical communication component comprising an optically observable description of the position of the self-describing fiducial and a second communication component configured to communicate the supplementary information. The supplementary information may include any of the principles or examples described above, including a spatial relationship between the self-describing fiducial and the surrounding environment. The first communication element may be further configured to communicate: the existence of the second communication component and/or supplementary information, at least one characteristic of the second communication component and/or supplementary information, the applicability of the second communication element and/or supplementary information. The first communication component may include one or more of: a printed matrix barcode, a projected printed matrix barcode, a barcode, an optical beacon comprising a modulated LED, a modulated traffic light, an enhanced billboard, a light on a navigating object or other appropriate element configured to communicate information. The second communicating component may include at least one of a matrix barcode, at least one modulated LED, a radio frequency communication device, a laser communication device, and other appropriate element(s) configured to communicate information.

Additionally or alternatively, a self-describing fiducial may include a communication element configured to communicate air flow information to one or more navigating objects, the air flow information comprising air flows interacting with local obstructions at or near ground level. For example, the term "at ground level" may include altitudes where drones navigate through urban canyons, or may include any portion of airflow that disturbed by objects on the ground, or may include altitudes where drones typically navigate to deliver objects (for example, below 500 ft elevation above ground level) or the term "at ground level" may describe the portion of the airflow that the airflow information is relevant to. The communication element may communicate the air flow information to the one or more navigating objects in the vicinity of the self-describing fiducial. For example, air flows may interact with local obstructions at or near ground level which may include buildings, trees, signs, large vehicles, towers, bridges, sculptures, local terrain features and other ground based objects and features.

In one example, the self-describing fiducial may include an air flow measurement device, wherein the air flow measurement device produces at least one of: a point measurement of wind speed in one or more directions, a volumetric measurement of wind speed in one or more directions, the force generated by wind on a feature of the self-describing fiducial an in situ wind measurement produced by a navigating object in the vicinity of the self-describing fiducial. Measurements produced by the air flow measurement device may be combined with additional information to produce an enhanced air flow model. The additional information may include at least one of: other air flow measurements, local air flow model, local weather forecast, local geometric models, information from other self-describing fiducials, and other available information or models.

The self describing fiducial may include a second communication element that is configured to communicate a position of the self-describing fiducial with respect to one or more spatial coordinate systems to one or more navigating objects.

In one embodiment a method includes observing, by a navigating object, a self-describing fiducial in the vicinity of the navigating object and optically communicating, by a communication element of the self-describing fiducial to the navigating object, a position of the self-describing fiducial. The method may further include communicating, by the self-describing fiducial, supplementary information to the navigating object and processing, by the navigating object, at least one of: the position of the self-describing fiducial and the supplementary information. The method may further include making, by the navigating object, an adjustment to at least one of: navigation states of the navigating object and guidance parameters of the navigating object. As discussed herein the guidance parameters may include a variety of geometric instructions, including but not limited to turning radius, altitude, speed, next waypoints, locations of additional self-describing fiducials or obstructions, locations of other navigating objects, etc.

The method may include communicating, by the communication element, characteristics of the supplementary information. The method may also include communicating applicability information of the self-describing fiducial to the navigating object and processing, by the navigating object, the applicability information to determine if supplementary information is applicable to the navigating object. Based on this or other determinations, changes can be made to at least one of: navigation states and guidance parameters of the navigating object.

The method may further include communicating, by the self-describing fiducial to the navigating object, validation information and validating, by the navigating object, the self-describing fiducial; and based on the validating, incorporating the position of the self-describing fiducial and supplementary information into at least one of: navigation states and guidance parameters of the navigating object.

The method may also include evaluating, based on information known by the navigating object, the position reported by the self-describing fiducial and the supplementary information reported by the self-describing fiducial and assigning a reliability score to the position reported by the self-describing fiducial and the supplementary information reported by the self-describing fiducial based on the evaluating and weight weighting the position reported by the self-describing fiducial and the supplementary information reported by the self-describing fiducial based on the reliability score. This can include applying, to navigation states and guidance parameters of the navigating object, the position reported by the self-describing fiducial and the supplementary information reported by the self-describing fiducial based on the weighting. The methods described herein are only illustrative and the steps of the method may be reordered, additional steps may be added, and steps may be removed or replaced.

Figure 24:
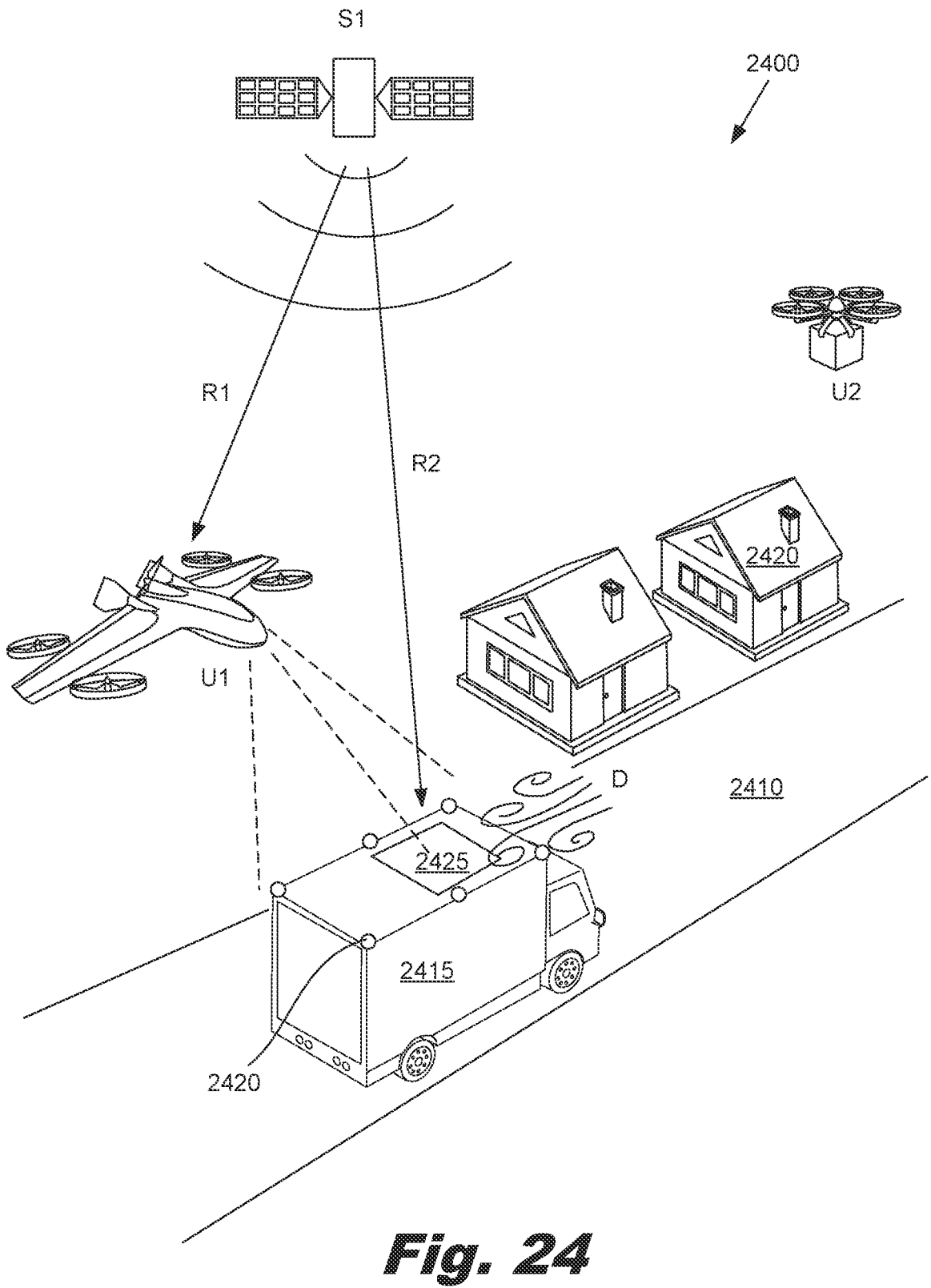
FIG. 24 shows an illustrative system incorporating self-describing fiducials used for navigation, according to embodiments of principles described herein.

FIG. 24 shows an illustrative system (2400) incorporating self-describing fiducials for navigation. The use of unmanned aerial vehicles (UAVs) for last-mile delivery of goods has received much attention in recent years. One compelling system architecture is that of a delivery truck (either manned or unmanned), which travels along a nominal path, delivering heavy or bulky items. Meanwhile, delivery UAVs autonomously land on the roof of the delivery truck, load an item compatible with the size and weight limitations of the UAV, and deliver to the destination. Such a system leverages the unique capabilities of the ground and air vehicles and increases the overall efficiency of the delivery system. An enabling component of the UAV/delivery truck system is a relative navigation architecture, with sufficient precision to enable autonomous landing of the UAV on the roof of a moving delivery truck.

In this example, a delivery truck (2415) travels through a neighborhood (2410), delivering packages that are either too large or too heavy for the delivery UAVs or other navigating objects. The efficiency of the delivery system is increased by tasking delivery UAVs (e.g. U1, U2) with smaller lighter packages. UAV U2 delivers the package to the destination (2420) while UAV U1 lands on the potentially-moving truck. Absolute position information about U1 and the truck is obtained from GNSS signals R1 and R2 from satellite S1. Precise relative state information is obtained from the camera observations of the truck-attached self-describing fiducials (2420). The aerodynamic disturbance environment (D) may also be estimated to enable a precision landing at a point where the capture mechanism secures the UAV to the truck roof, in preparation for the loading of another package.

In one embodiment, camera-based observations by the UAV U1 of delivery truck-attached self describing fiducials (2420) provide line-of-sight measurements to a known location (2425) on the delivery truck. The UAV U1 processes the camera observations to estimate the UAV state relative to the delivery truck (2415). The self describing fiducial information may be augmented with supplementary information, transmitted over optical and/or radio frequency channels. Supplementary information could include information related to the delivery truck state, which may include at least one of: position, velocity, attitude, angular rate, acceleration, wheel speed, steering angle, wind direction and speed, and wheel diameter. The self describing fiducials and supplementary information may also be used to predict the state and associated uncertainty of the delivery truck at future times, including at least one of: the estimated landing time, the time where a landing becomes imminent, and intermediate times. Additionally, the aerodynamic disturbance environment created by air passing over the delivery truck may be estimated, in addition to the UAV states relative to the delivery truck states. The UAV U1 may use these estimates of the aerodynamics disturbance environment to predict the probability of a successful landing, make a go/no go decision, or adjust the approach trajectory. The UAV navigation system may process both line-of-sight measurements to the truck-attached self-describing fiducials (2420) and GPS signals to the UAV and to the truck, further refining the relative state of the UAV with respect to the delivery truck. In some examples, the delivery truck contains a contact or noncontact charging mechanism, such that the UAV charges its battery while a new package is loaded onto the UAV. In another embodiment, a mechanical or electromagnetic capture mechanism may bind the UAV to the delivery truck, such that the UAV doesn't move while loading a new package. In some embodiments, the truck (2415) or other object may modify its behavior to facilitate rendezvous with the UAV.

The principles described above, including transmission or calculation of augmented information with velocity, acceleration, attitude, and attitude rates of the self-describing fiducial may be used in a variety of situations including the rendezvous between one or more navigating objects or other coordinated motion between two or more navigating objects.

Figure 25:
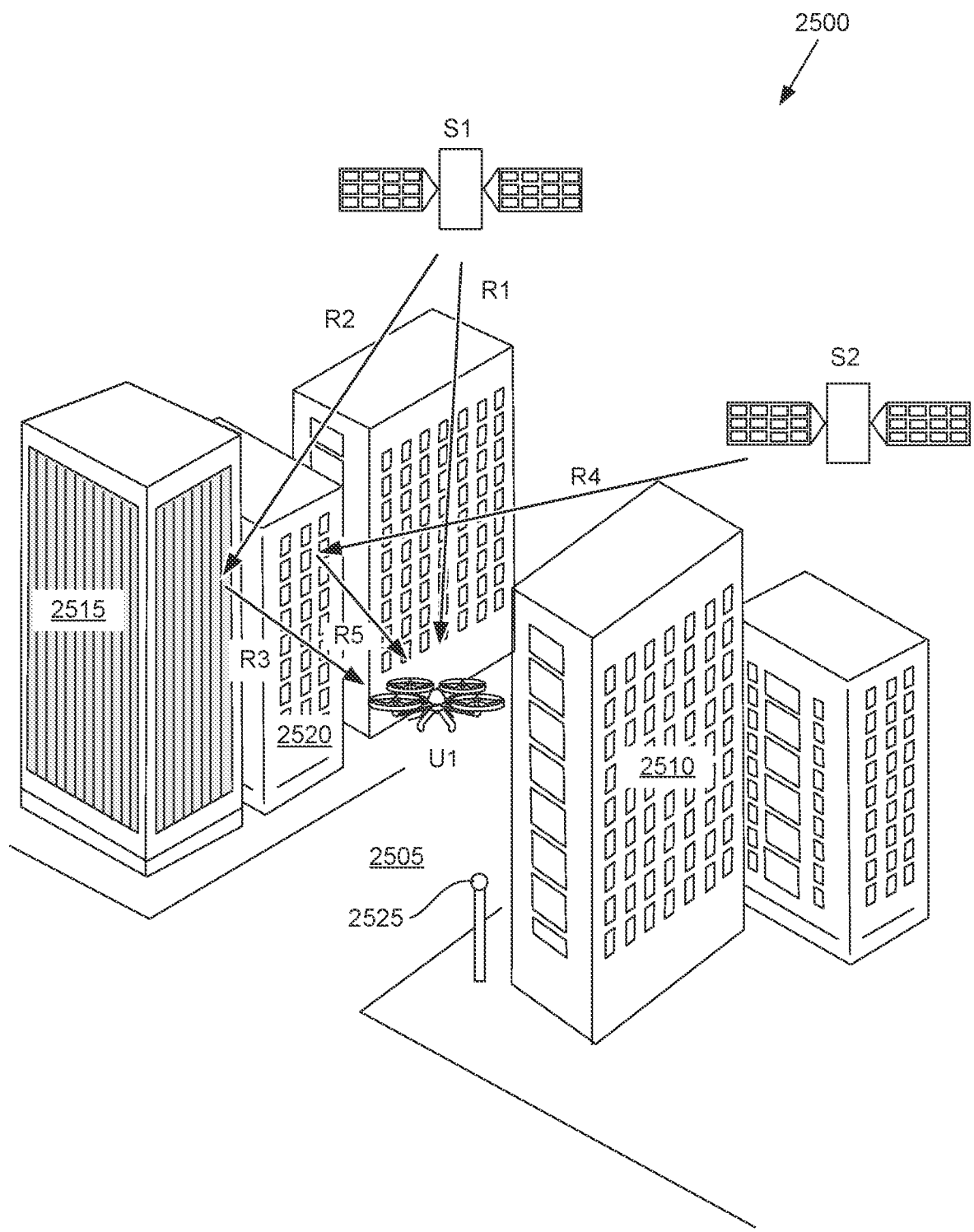
FIG. 25 shows an illustrative system for improving navigation and determining position sensing errors using self-describing fiducials, according to embodiments of principles described herein.

FIG. 25 shows an illustrative system (2500) for improving navigation and determining position sensing errors using self-describing fiducials. In one example, self-describing fiducials may be part of a system for automatic characterization of the GPS multipath environment. A GPS multipath environment may exist in a variety of situations, including where signals from GPS satellites are reflected from objects before being received by the navigating objects. This may introduce an error in the position calculated by the navigating object.

As shown in FIG. 25, a navigating object U1 is passing through an urban environment that includes a street (2505) lined with large buildings (2510, 2515, 2520). In this example, there are at least two GPS or other satellites (S1, S2) above the navigating object U1. Only one satellite (S1) is directly visible to the navigating object U1. A direct line of sight with the other satellite S2 is obscured by a nearby building (2510). The signals that U1 receives from the satellites may be confusing because it receives only one direct transmission (R1) and two reflected transmissions (R3, R5). In this example, the transmission R4 from the obscured satellite S2 cannot directly reach the navigating object U1 but is reflected off a building (2520) before reaching the vehicle U1. The additional path R5 the signal travels before reaching the navigating object U1 could induce errors in the calculated position of the object U1. GPS signals transmit a precise time to the navigating object. By calculating the time that is encoded in the signal to an internal clock, the navigating object U1 can determine how long it took the signal to travel from the satellite S2 to the object U1. This is then translated into a distance that U1 is from the satellite S1 and, with knowledge of the satellite orbit/position, the object U1 can determine its location relative to the satellite. When multiple signals are received, the object U1 can determine its location in three dimensional space with increasing accuracy. However, if one or more of the signals is reflected before being received, the navigating object may calculate an incorrect position that is farther from the satellite than its true position. In the example shown in FIG. 25, the navigating object will receive two reflected signals (R3, R5) from the satellites (S1, S2). These reflected signals may lead the navigating object to conclude that it is lower and to the left of its actual position. As discussed above, multipath GPS environments can be challenging to navigate and the presence of self-describing fiducials as an absolute reference may save the object from critical navigation errors.

Specifically, in an inertial navigation system, accelerometers and gyros are used to propagate the vehicle state, comprising position, velocity, and attitude. Standard estimation filters (e.g. EKF, UKF, PF) are used to optimally correct the state errors that naturally accumulate due to imperfections in the accelerometer and gyro data. For tightly-coupled GNSS-aided inertial navigation, the filter processes range to each visible satellite, corrupted by an unknown receiver clock bias. The clock bias-corrupted range measurement is termed a pseudorange. The navigation filter is therefore tasked with estimating not only the vehicle state, but also the receiver clock bias, and in some cases the clock bias drift rate. This is done by simply concatenating the vehicle state with clock states, inside the navigation filter. If an inertial navigation filter is not available, a set of 4 or more pseudorange measurements can alternatively be used to calculate position of the GNSS receiver, without the complexities of a navigation filter. In urban environments, the signal arriving at the vehicle is often a combination of the direct signal and reflections from nearby buildings. In some cases, the direct signal is blocked completely, and the vehicle receives only the reflected signal. The effect of multipath is an additional bias, unique to each pseudorange measurement that is dependent on the interaction between building geometry, the vehicle position, and satellite positions. The net effect is an error in pseudorange as large as 30 m, depending on the difference in the path length between the direct and reflected signals. In the invention described below, the state information obtained from processing self describing fiducials is utilized to characterize the multipath environment.

As discussed above, the characteristics of a multipath GPS environment may change due to a number of different factors, including but not limited to: the changing positions of GPS satellites, the position of the navigating objects, angular or spatial differences in reflective characteristics of the nearby objects, or other parameters. However, the existence of one or more fiducials that can be used by the navigating object to calculate a more accurate position can also be used to characterize the multipath environment at varying levels. For example, the navigating object U1 may calculate that its position is lower and to the left of its true position using the GPS information, but may verify its true position using the self describing fiducial (2525). It can then calculate the error between the GPS derived position and its actual position. It may immediately transmit this information to other navigating objects for use as they follow it through the area and/or it may transmit the information to a repository for additional dissemination and/or modeling. Due to the dynamic nature of the reflections, the error measurements made by a single object navigating through the urban canyon at a specific time may have limited use except to objects that are following it closely along a similar path. Specifically, the state vector of the navigation system on U1 is augmented with a multipath range associated with each pseudorange signal. Camera observations of one or more self describing fiducials may simultaneously determine the state of the vehicle as well as the multipath ranges. The multipath information is provided to nearby GNSS users to increase localization accuracy.

In one example, the state vector of the navigation system is augmented with a multipath range associated with each pseudorange signal. Camera observations of the self describing fiducials simultaneously determine the navigation states of the vehicle as well as the multipath ranges of each satellite for a given vehicle position and satellite position. The multipath ranges, satellite ephemerides, and vehicle position form a labeled training dataset for a supervised machine learning algorithm of the regression type. The result is a multipath prediction engine (MPE) which provides pseudorange corrections for each visible satellite based on vehicle position and satellite ephemeris.

Additional modeling and measurements can take into account different navigation paths and satellite positions to render a more complete model of the multipath environment. Specifically, the information provided by navigating objects could provide supervised training data for a machine learning algorithm to provide a mapping between satellite ephemerides and location in a city. In some situations, drones could be directed to paths that fill holes in the multipath map.

In one embodiment, the training data of the MPE also includes an efficiently-parameterized 3D model of the surrounding buildings. One parameterization includes a planar description of building faces comprising a unit normal and four corners of the building extents. In this case, the MPE learns the reflectivity properties of the surfaces, and refines the parametric model from the observed data, resulting in a MPE that is more generalizable to new locations, times/satellite positions.

In some situations, the model may have high enough fidelity that the existence of multipath GPS signals may actually be used as a navigation aid. For example, a navigating object may enter the urban canyon under less-than-ideal conditions but it can use the model of the multipath environment to sense the location of the buildings and its location/error along its desired path. For example, if the navigating object detects a smaller than expected difference between paths R3/R5 and the line-of-sight signal R1, it may conclude that it has drifted closer to the buildings (2515, 2520) and/or lower than it intended and take corrective action. Additionally, the navigating object may use the multipath model to expect that there will be changes in the reflectance along this proposed path. If it does not see the expected changes as it moves forward, it may conclude that its position includes an error or that the environment has changed (e.g. a building has been demolished, a surface of the building has been altered, something is obscuring the building, a GPS satellite has malfunctioned, etc.). It may again check its true/estimated position using one or more self-describing fiducials (if available) and it may transmit/incorporate these changes back to the model. In this way, the reflections of GPS signals may be a significant benefit to navigation instead of a hindrance. In some embodiments, a stationary self-describing fiducial may act in a number of ways to improve navigation in its vicinity. For example, the self-describing fiducial (2525) may act as a differential GPS transmitter, a stand-alone GPS transmitter, may monitor GPS availability and reflection errors, and/or serve as an anchor data point for a model/simulation of the GPS environment.

FIGS. 26A-26D describe distributed sensing among multiple navigating objects. In one example, a drone swarm (2600) may be used as a dispersed, reconfigurable sensor where peripheral members of the swarm position themselves to acquire position knowledge, then pass that information throughout the swarm. In addition to position knowledge, other information could be obtained that could benefit the swarm or its mission. In some examples, particular members of the group/swarm could seek optimal positioning to retrieve particular information.

Figure 26A:
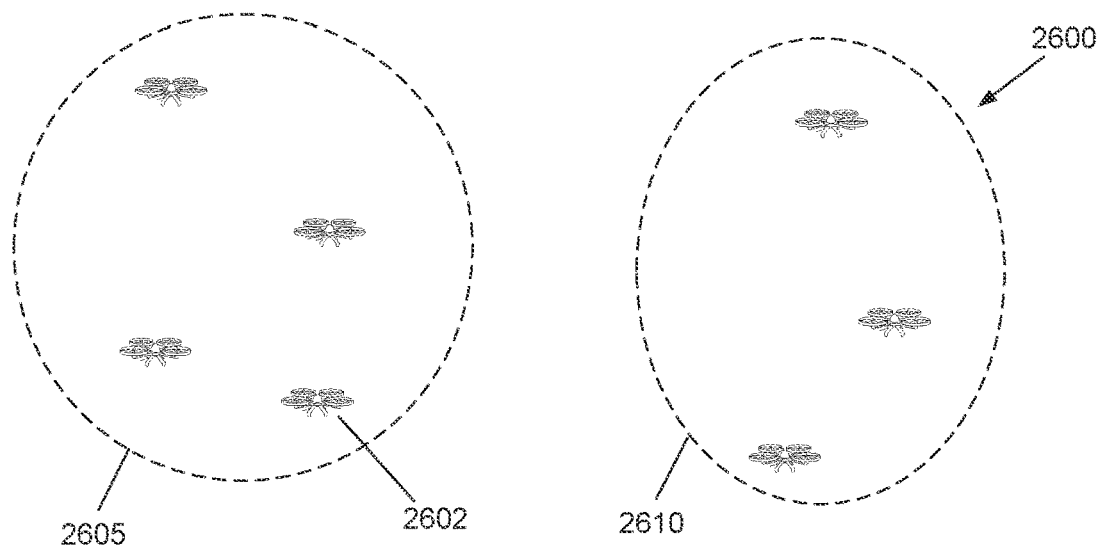
FIGS. 26A-26D describe distributed sensing among multiple navigating objects, according to embodiments of principles described herein.

FIG. 26A shows a swarm of drones (2600), which is a group of individual members (2602) that work together, performing local actions that prioritize the overall mission(s) of the swarm. When taken in aggregate, swarms of drones have more degrees of freedom than a single drone has. Swarms may exploit this flexibility to execute advanced behaviors for navigation purposes. For example, swarms may use self-describing fiducials in various ways to achieve results that would be difficult to obtain in other ways, particularly in environments where traditional navigation aiding sources such as GPS are unavailable or degraded. In this embodiment, the swarm has two groups: the main body (2605) and a group of peripheral drones (2610). In one embodiment, a swarm (2600) may configure itself such that one or more peripheral members (2610) of the swarm may obtain navigation aiding information from one or more self-describing fiducials in the vicinity. In some embodiments, the swarm members (2610) that obtained the navigation aiding information may be equipped to function as self-describing fiducials, so that they and other members of the swarm (2605) may obtain derivative navigation aiding information from them. In other embodiments, the other members of the swarm (2605) may obtain supplementary information from the swarm members (2610) that obtained information from the self-describing fiducial.

Figure 26B:
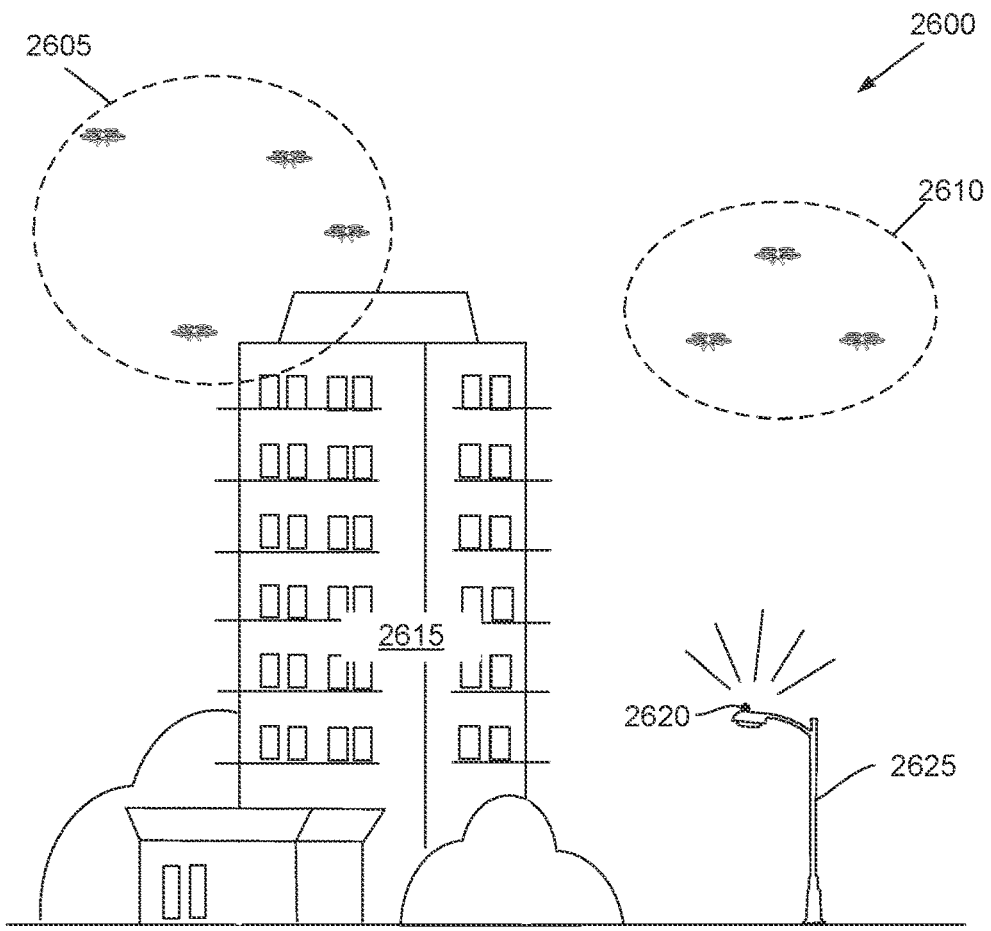
Figure 26C:
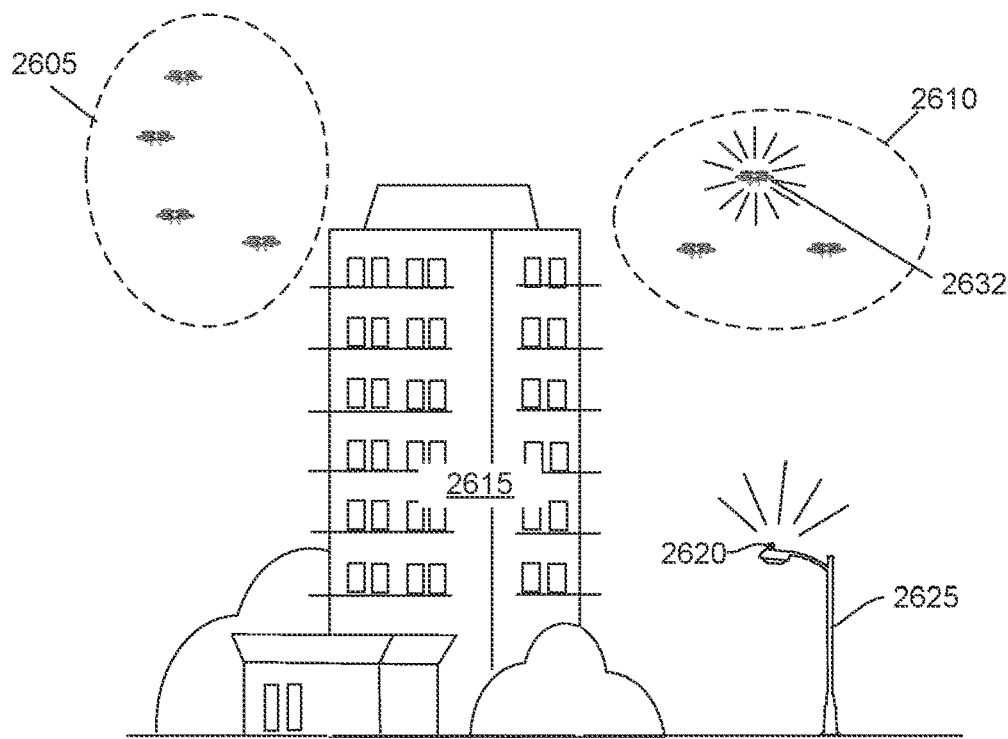

In FIG. 26B, the swarm (2600) is distributed throughout an urban landscape, with the peripheral members (2610) of the swarm on one side of a building (2615) and the main body (2605) above and on the other side of the building. There is a self-describing fiducial (2620) mounted on streetlight (2625). The drones in the peripheral group (2610) can each use the self-describing fiducial (2620) to improve their location knowledge and/or other navigation parameters. However, this self-describing fiducial (2620) is visible to each of the members of the peripheral group but not visible to the main body of drones (2605). However, as shown in FIG. 26C, the one or more drones in the peripheral group (2610) are visible to at least some of the members of the main body (2605). If the drones in the peripheral group are configured as self-describing fiducials and they are then visible to members of the main group (2605), these can then sense the location of the drones in the peripheral group and obtain information from their self-describing fiducials. In this example, the uppermost drone (2632) in the peripheral group (2610) has self-describing fiducial capabilities and broadcasts its fiducial information such that it is visible to drones in the main body (2605). This propagates information from the original self-describing fiducial (2620) through the drone swarm.

In another embodiment, a swarm (2600) may be configured such that each member of the swarm may function as a self-describing fiducial. Such a swarm may reconfigure itself such that one or more members of the swarm (2600) may receive navigation aiding information from one or more self-describing fiducials (2620) in the vicinity. The swarm members that obtain this navigation aiding information may position themselves in ways that maximize the quality of derivative navigation aiding information that they will communicate to swarm members as a self-describing fiducial.

Figure 26D:
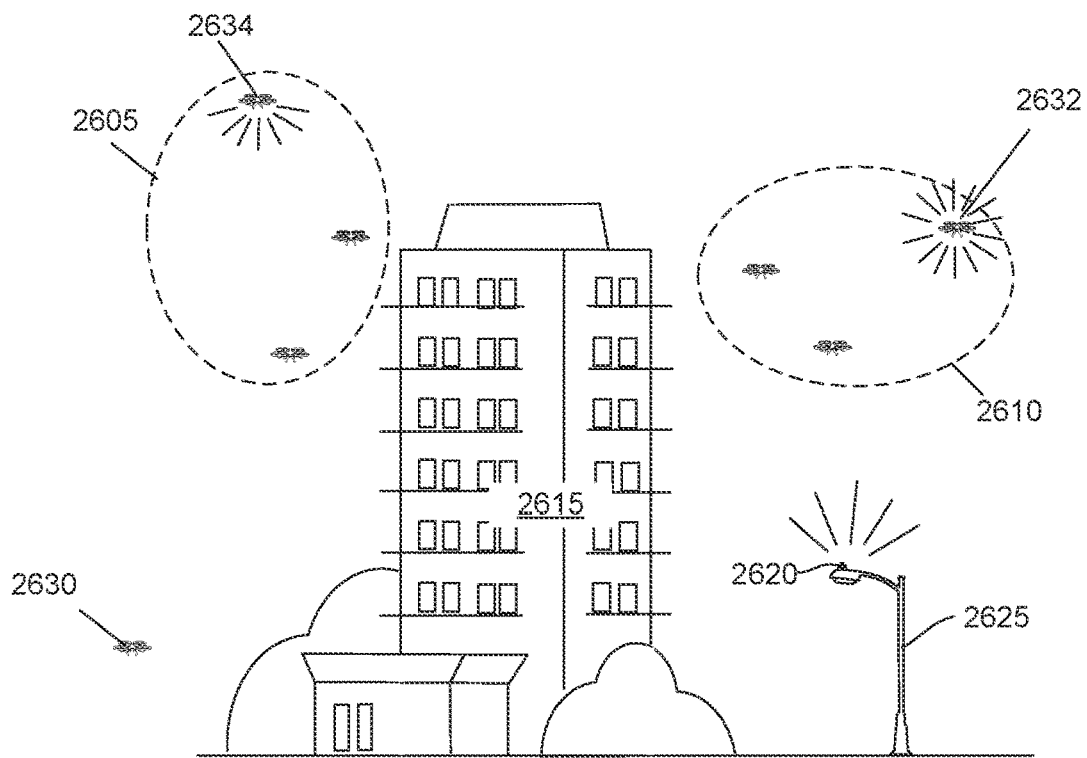

In the example shown in FIG. 26D, the swarm (2600) may configure itself in ways that maximize the quality of derivative navigation aiding information that certain members (e.g. 2630) of the swarm will obtain. In this illustration, the lower drone (2630) has dropped out of the main group (2605) to investigate something closer to the ground. However, because it is on the other side of the building from the self-describing fiducial (2620), the drone (2630) cannot directly utilize the information from it. Further, it may have reduced access to GPS information because of reflections and lack of visibility of satellites in the urban canyon. The drones in the peripheral group (2610) can see the self-describing fiducial and can propagate the information to other drones in the main body (2605). In this example, the uppermost drone (2634) acts as a self-describing fiducial and is visible to the lower drone (2630). The uppermost drone (2634) takes its own navigation information, the transferred information from the self-describing fiducial on the peripheral drone (2632), and any GPS information it can obtain from its higher vantage point. It then constructs more accurate navigation information which can be transmitted to the lower drone (2630). This may significantly improve the navigation and planning for the isolated lower drone (2630). This approach may allow certain members of the swarm (2600) to carry out a task that requires improved navigation knowledge at a distance from or out of the direct line of sight of existing self-describing fiducials (2620).

Additionally, a swarm may configure itself such that one or more members of the swarm may obtain supplementary information from one or more self-describing fiducials in the vicinity. In some embodiments, the swarm members that obtained the additional information may be equipped to function as self-describing fiducials which may relay the supplementary information, so that members of the swarm may obtain the supplementary information from them. Supplementary information could include information describing a spatial relationship between the self-describing fiducial and the surrounding environment, wherein the supplementary information comprises at least one of: additional navigation-aiding information and guidance-aiding information.

The situation described above is only an example. There are many situations where distributed sensing and self-describing fiducials may be of value. For example, where drones are navigating indoors, GPS information may be inaccessible and tight maneuvering may require high precision navigation information to accomplish a task in a prompt and reliable manner. Distributed sensing and self-describing fiducials may significantly improve performance in these situations. Aerial drones are only one example. In some situations, ground based self-navigating objects have more difficulty due to their limited line of sight, significant obstacles, dynamic surroundings, position in the bottom of the urban canyons, and slower travel speeds (which may allow time for more navigation errors to accumulate). The same principles described above can also be applied to ground based or other drones. For example, submerged or subterranean drones may have a much more difficult time seeing self-describing fiducials, receiving GPS signals and other navigation aids. Consequently, utilizing a swarm as a distributed sensor system could be even more valuable. In one example, a drone swarm search through rubble for survivors may utilize distributed sensing and self-describing fiducials for both location and for communication reliability. In another example, maritime navigating swarms or objects may include a self-describing fiducial which may be a floating buoy that has access to GPS information that then broadcasts its location using sound waves that pass through the water to submerged navigating objects. These objects can then interpret the sonic transmission and update their navigation parameters. Where multiple marine drones are traveling together, there may be some types that are configured to travel at or on the surface for some period of time. They may communicate through a variety of techniques as self-describing fiducials to other members in the swarm that have fewer capabilities or are unable to obtain the same information.

As discussed above, there are a variety of different approaches and technologies that self-describing fiducials could use to communicate with navigating objects or between fiducials themselves. For example, when observed at a distance, a self-describing fiducial may communicate coarse position/information and when prompted or when observed from a closer distance, the self-describing fiducial may communicate more fine/detailed position/information. In some examples, a fiducial may be shielded such that it can only be seen, triggered, and/or communicate in a single direction or range of directions. This may provide a number of benefits, including only communicating in a direction or range that the information is relevant and/or limiting interference/noise by broadcasting or only being visible to navigating objects that need the information. The shielded fiducial(s) may be shielded spatially, temporally, spectrally, and/or electronically in a data stream. For example, in FIG. 26D it may be undesirable for the drone (2632) to broadcast in a 360-degree pattern. It may be preferable for it to broadcast only in the direction of the receiving drone (2634) for reasons of stealth, energy efficiency, to avoid disturbance, for higher transmission power/range, security, and other reasons. Consequently, the object acting as a self-describing fiducial may require a "handshake" with a requesting object. This may allow the transmitting self-describing fiducial to verify the identity/location of the requesting object and to ascertain the information/format that may be useful to the requesting object. In drone swarms, the transmitting object may move to a better vantage point to allow it to both see external self-describing fiducials and to act as a self-describing fiducial for the requesting object.

In some examples, a time-varying fiducial may include synchronization information that allows for a level of timing to be determined by other objects around it. For example, if fiducials need to be synchronized or asynchronized for some reason, the timing information could be shared. There are a number of ways that synchronization signals could be created/broadcast/received. For example, a pulse may be sent out in a specific pattern, such as every second. This would allow the receiving fiducials/objects to recognize the broadcasting fiducial's time frame/clock and synchronize accordingly if desired.

As discussed herein, a fiducial may also communicate, in addition to its position, its velocity and/or acceleration. This may be particularly useful for moving fiducials, which may also indicate their status or intention. For example, an object/fiducial may have a status such as "waiting for an event" and an intention such as "accelerating to the left" after waiting is concluded. This information may assist other navigating objects to create optimal paths that account for future motion of the fiducial/object.

In some examples, there may be temporary fiducials that are placed to communicate additional information that navigating objects may not possess. For example, a navigating car may have information about a roadway: its shape, the speed limit, and traffic conditions. However, this information may not be up to date. There may be road construction, an accident, slowed traffic, road damage, an object in the road, changed road conditions (e.g. water/snow/ice), a traffic pattern may have changed. In these and other situations, a temporary fiducial(s) may be placed to communicate the change and/or advise changes in the behavior of the navigating device or modification of its navigating parameters. For example, if there is debris or road damage the fiducial may advise changing lanes. If there are stopped or emergency vehicles on the road they may place cones or other markers on the road that include fiducial information. This information may include the identity of the vehicles stopped, the required action by navigating objects, a request for help, etc. A variety of other approaches could be used. For example, the fiducial may be affixed to a sign post and only become active when a particular event occurs. The fiducial may also identify more precisely the location and nature of the change in such a way that the navigating object can more precisely navigate the disruption. For example, the fiducial may indicate the location and nature of a crash, which may help both navigating objects moving around the crash and emergency vehicles coming to assist. This is significantly more effective than a driver simply seeing the traffic around them slow down and wondering what the issue is. The fiducial may communicate ways the driver could be of assistance by indicating a transportation, medical, or emergency need.

As discussed above, self-describing fiducials may also have a number of different approaches to communicate or make themselves visible. For example, a self describing fiducial may include a patterned heat signature or emit sound waves for direction finding acoustic systems, including submerged systems.

Search and rescue is an important field where time is critical. Automating search and rescue processes is one way to reduce timelines and save lives. Self-describing fiducials and drones may enable this automation in many cases. In one example, a group of backcountry skiers experiences an avalanche and one member of the group is buried in the snow. In this example, all skiers in the group are equipped with an RF self-describing fiducial, and each skier also has an INS/GPS navigation system containing accelerometers and gyros which is configured to sense a skier being buried in an avalanche event. The self-describing fiducial on the buried skier automatically begins broadcasting its last known GPS location along with a predefined beacon signal. In this example, all skiers in the group also have a small autonomous drone configured to obtain navigation and guidance aiding information from the self-describing fiducial carried by the group and equipped to track the predefined beacon signal. The drone may normally be mounted on top of a ski helmet, in a backpack, or in another accessible location. The drone of one of the skiers who was not buried in the avalanche is deployed. This drone initially proceeds to the location communicated by the self-describing fiducial to achieve a coarse location of the buried skier. The drone then performs a flight pattern designed to accurately navigate relative to the buried skier in a finer way using the beacon in minimal time while maximizing the location accuracy. Once the drone has located the buried skier to an acceptable degree of accuracy, it hovers above the buried skier's location to signal the remaining skiers where to perform rescue operations. It continues to hover over the buried skier's location until commanded to land or until it runs low on battery power, at which point it may land on the spot directly above the buried skier to signal where to perform rescue operations.

In another example, snowmobilers use the self-describing fiducial and drone described above to reduce avalanche rescue timelines. In another example, snowboarders use the self-describing fiducial and drone described above to reduce avalanche rescue timelines. In yet another example embodiment, a group of hikers use a similar self-describing fiducial and drone as described above to locate a lost hiker.

In another example, the self-describing fiducials described above comprise a smart phone with an appropriate app. In yet another example, a smart phone self-describing fiducial uses Bluetooth to communicate guidance aiding information. In another example, a smart phone uses WiFi signals as the predefined beacon. In yet another example embodiment, a smart phone uses both Bluetooth and WiFi to both communicate guidance aiding information and as the predefined beacon.

Note that while the terms GNSS and GPS are used, the terms refer to geolocation systems that rely on time or other signals that are sensed by a receiver and are used to determine its location. These systems may include elements that are orbital or fixed, include cell network signals, WiFi signals, signals from mobile devices, principles associated with the TRANSIT, OMEGA, LORAN, Decca Navigator systems, etc. Orbital systems may include the GPS, GLONASS, BeiDou, Galileo, Quasi-Zenith or other systems, deployed or yet to be deployed.

In one example of a navigation system at least one self-describing fiducial includes a communication element that communicates navigation state estimation aiding information. This information may include a range of information including a geographic position of the self-describing fiducial with respect to one or more coordinate systems. A wide variety of navigating objects may be configured to receive navigation information from an exterior system (such as GNSS signals, or other signals), receive navigation state estimation aiding information from the self-describing fiducial, and compare the navigation information received from the exterior system to the navigation state estimation aiding information to improve estimates of navigation parameters of the navigating object. The navigating objects may also compare internally generated information (such as those from radar, lidar, imaging, ultrasound, etc.) with the navigation state estimation aiding information.

In some embodiments, the self-describing fiducial may be a component or function of a second navigating object. The self-describing fiducial may be the origin of the navigation state estimating aiding information, may be a repeater of navigation information from other sources or may combine navigation information generated internally with outside information.

The communication element may be in visual proximity to a path of the first navigating object. The first navigating object may be configured to optically detect the communication element, receive the navigation state estimation aiding information, determine at least one of its position, velocity or orientation with respect to the self-describing fiducial. The first navigating object may then alter its path based on the navigation-aiding information. In some examples, the self-describing fiducial may be in view of a first navigating object and not in the view of a second navigating object, but the first navigating object transmits the navigation state estimation aiding information obtained from the self-describing fiducial to the second navigating object. This may take a wide variety of forms, including where the first navigating object communicates electronically with the second navigating object and/or where the second navigating object images the first navigating object. As discussed above, one or more of the navigating objects may include a self describing fiducial and may transmit information that is internally or externally generated, combined to improve accuracy, etc.

In some examples, the first and second navigating objects may be members of a larger swarm of drones. In this example the drone swarm may act as a distributed reconfigurable sensor(s). Drone at the perimeter of the swarm (or elsewhere) may image self-describing fiducials and propagate the information to other drones in the swarm.

As discussed above, the navigating object may receive degraded navigation information from the exterior system. For example, the degraded navigation information may include at least one of: spoofed GNSS signals, reflected GNSS signals, troposphere/ionosphere induced GNSS signal errors, GNSS ephemeris errors, and jammed GNSS signals. In some examples, the first navigating object (or other navigating object) may be configured to image the self-describing fiducial, derive navigation-aiding information including the geographic position of the self-describing fiducial and characterize the degraded navigation information. The characterization of the degraded navigation information may include modeling the degraded navigation information as a function of at least one of: spatial location of the navigating object, locations of objects around the navigating object, and locations of objects producing the degraded navigation information. This characterization may be performed by the navigating object itself, by a distributed computing platform residing in multiple navigating objects or may be performed an exterior system in communication with the navigating objects. The modeling of the degraded navigation information may generate a new model or may improve an existing model. As discussed above, the degraded navigation information comprises reflected GNSS signals and a model of the reflected GNSS signals may include, explicitly or implicitly, spatial locations of objects producing reflected GNSS signals and the locations of objects producing GNSS signals.

In one example, the self-describing fiducial may be physically connected to a second navigating object and the first navigating object may image the self-describing fiducial on the second navigating object. The first navigating object may be configured to use navigation state estimation aiding information from the self-describing fiducial to rendezvous with the second navigating object. The self-describing fiducial also communicate supplementary information to the first navigating object. This supplementary information may include at least one of: additional navigation-aiding information and guidance-aiding information. The first navigating object rendezvousing with the second navigating object may include receiving at least one of: an object to be transported and energy to be consumed. For example, the first navigating object comprises a ground-based vehicle and the second navigating object comprises a UAV. In some examples, the self-describing fiducial is configured to communicate navigation parameters of the second navigating object and the second navigating object may alter its motion to facilitate rendezvous with the first navigating object.

In several illustrative embodiments, a navigation system may include a self-describing fiducial located proximate to a route to be navigated; and a first navigating object configured to measure GNSS signals and observe the self-describing fiducial, wherein the GNSS signals and self-describing fiducial observations are combined to inform a model correcting errors in GNSS signals. A second navigating object may be configured to measure GNSS signals, and consult the model to correct errors in GNSS signals. The second navigating object may be in proximity in time and/or space with the first navigating object or may be remote in time and/or space from the first navigating object. The model may explicitly or implicitly include spatial information of physical objects proximate to the route and electromagnetic surface reflection information for physical objects proximate to the route.

A method for correcting GNSS signals may include measuring GNSS signals, observing a self-describing fiducial, combining the GNSS signals and the self-describing fiducial observation to inform a model correcting errors in GNSS signals, and measuring GNSS signals and correcting the GNSS signals by consulting the model. This method may be performed in whole or in part by one or more navigating objects. For example, the method may be implemented in the following illustrative manner: observing, by a first navigating object, a first self-describing fiducial in the vicinity of the navigating object; optically communicating, by a communication element of the first self-describing fiducial to the first navigating object, a position of the first self-describing fiducial; processing, by the first navigating object, the position of the first self-describing fiducial; making, by the first navigating object, an adjustment the first navigating object's navigation states; and propagating, by a second self-describing fiducial physically connected to the first navigating object to a second navigating object, information derived from the position of the first self-describing fiducial.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

What is claimed:

1. A navigation system comprising:
at least one self-describing fiducial configured to communicate navigation state estimation aiding information comprising a geographic position of the self-describing fiducial with respect to one or more coordinate systems; and
a first navigating object configured to receive navigation information from an exterior system, the first navigating object further comprising an electromagnetic receiver to receive navigation state estimation aiding information from the self-describing fiducial, and compare the navigation information received from the exterior system to the navigation state estimation aiding information to improve estimates of navigation parameters of the first navigating object, wherein the first navigating object is configured to spatially alter its maneuvers through its physical surroundings based on the improved estimates of the navigation parameters.

2. The system of claim 1, wherein the self-describing fiducial is a component or function of a second navigating object and wherein the exterior system comprises a GNSS system.

3. The system of claim 1, further comprising a second navigating object spatially maneuvering wherein the self-describing fiducial is in view of a first navigating object and not in the view of a second navigating object, wherein the first navigating object transmits the navigation state estimation aiding information obtained from the self-describing fiducial to the second navigating object.

4. The system of claim 3, wherein the first navigating object comprises a second self-describing fiducial.

5. The system of claim 3, wherein the first and second navigating objects are members of a larger swarm of drones, wherein drones at the perimeter of the swarm image self-describing fiducials and propagate the information to other drones in the swarm.

6. The system of claim 1, wherein the navigating object receives degraded navigation information from the exterior system.

7. The system of claim 1, wherein the degraded navigation information comprises at least one of: spoofed GNSS signals, reflected GNSS signals, troposphere/ionosphere induced GNSS signal errors, GNSS ephemeris errors, and jammed GNSS signals.

8. The system of claim 1, wherein the first navigating object is configured to image the self-describing fiducial, derive navigation-aiding information including the geographic position of the self-describing fiducial and characterize the degraded navigation information.

9. The system of claim 8, wherein characterizing the degraded navigation information comprises modeling the degraded navigation information as a function of at least one of: spatial location of the navigating object, locations of objects around the navigating object, and locations of objects producing the degraded navigation information.

10. The system of claim 8, wherein the degraded navigation information comprises reflected GNSS signals.

11. The system of claim 10, wherein a model of the reflected GNSS signals comprises spatial locations of objects reflecting GNSS signals and the locations of objects producing GNSS signals.

12. The system of claim 1, wherein the self-describing fiducial is physically connected to a second navigating object and the first navigating object images the self-describing fiducial on the second navigating object, wherein the first navigating object is configured to use navigation state estimation aiding information from the self-describing fiducial to rendezvous with the second navigating object.

13. The system of claim 12, wherein the self-describing fiducial is further configured to communicate supplementary information to the first navigating object, the supplementary information comprising at least one of: additional navigation-aiding information and guidance-aiding information.

14. The system of claim 12, wherein the first navigating object rendezvousing with the second navigating object comprises receiving at least one of: an object to be transported and energy to be consumed.

15. The system of claim 14, wherein the first navigating object comprises a ground-based vehicle and the second navigating object comprises a UAV.

16. The system of claim 12, wherein the self-describing fiducial is configured to communicate navigation parameters of the second navigating object and wherein the second navigating object alters its motion to facilitate rendezvous with the first navigating object.

17. A navigation system comprising:
a self-describing fiducial located proximate to a route to be navigated; and
a first navigating object configured to measure GNSS signals and observe the self-describing fiducial, wherein the GNSS signals and self-describing fiducial observations are combined to inform a model correcting errors in GNSS signals;
wherein the first navigating object is configured to spatially alter its motion through its physical surroundings based on the corrected GNSS signals.

18. The system of claim 17, wherein a second navigating object is configured to measure GNSS signals, and consult the model to correct errors in GNSS signals.

19. The system of claim 17, wherein the model comprises spatial information of physical objects proximate to the route and electromagnetic surface reflection information for physical objects proximate to the route.

20. A method for correcting GNSS signals comprising:
measuring GNSS signals by a navigating object;
observing a self-describing fiducial;
combining the GNSS signals and the self-describing fiducial observation to inform a model correcting errors in GNSS signals;
measuring GNSS signals and correcting the GNSS signals by consulting the model and
spatially altering motion of the navigating object through its physical surroundings based on the corrected GNSS signals.

* * * * *